US006865215B1

(12) United States Patent
Russell et al.

(10) Patent No.: US 6,865,215 B1
(45) Date of Patent: Mar. 8, 2005

(54) SPREAD SPECTRUM DIGITAL DATA COMMUNICATION OVERLAY SYSTEM AND METHOD

(75) Inventors: Steve F. Russell, Ames, IA (US); Michael L. Hageman, Ely, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/505,463

(22) Filed: Feb. 16, 2000

(51) Int. Cl.[7] ............................................. H04B 1/713
(52) U.S. Cl. ..................................... 375/133; 375/135
(58) Field of Search ................................ 375/130, 132, 375/133, 140, 141, 135, 136, 346

(56) References Cited

U.S. PATENT DOCUMENTS

| | | | | |
|---|---|---|---|---|
| 5,689,273 A | * | 11/1997 | Bailey et al. | 342/407 |
| 5,703,874 A | * | 12/1997 | Schilling | 370/335 |
| 5,737,358 A | * | 4/1998 | Ritz et al. | 375/133 |
| 5,995,043 A | * | 11/1999 | Murphy | 342/357.03 |
| 6,026,277 A | * | 2/2000 | Gavrilovich | 455/11.1 |
| 6,131,013 A | * | 10/2000 | Bergstrom et al. | 455/63.1 |
| 6,275,518 B1 | * | 8/2001 | Takahashi et al. | 375/135 |
| 6,334,047 B1 | * | 12/2001 | Andersson et al. | 455/69 |
| 6,490,257 B1 | * | 12/2002 | Watanabe et al. | 370/318 |
| 6,549,784 B1 | * | 4/2003 | Kostic et al. | 455/501 |

OTHER PUBLICATIONS

Matolak, D.W., CDMA for Communications in the Aeronautical Environment, 10/97, AIAA/IEEE, 16th Digital Avionics Systems Conference, p. 21–28.*
Wang, J., "Cellular CDMA Overlay Systems", *IEEE Proceedings on Communications*, vol. 143, Dec., pp. 389–395, 1996.
Wang, J., and Milstein, L.B., "CDMA Overlay Situations for Microcellular Mobile Communications", *IEEE Transactions–on–Communications*, vol. 43, Feb./Mar./Apr., pp. 603–614, 1995.
Wei, P., Zeidler, J.R., and Ku, W.H., "Adaptive Interference Suppression for CDMA Overlay Systems", IEEE J. Selected Areas in Communications, vol. 12, No. 9, Dec., pp. 1510–1523, 1994.
Ketchum, J.W., and Proakis, J.G., "Adaptive Algorithms for estimating and suppressing Narrowband Interferes in PN Spread Spectrum Systems", *IEEE Trans. on Communications*, vol. COM–30, May, pp. 913–924, 1982.
Hsu, F.M., and Giordano, A.A., "Digital Whitening Techniques for Improving Spread Sectrum Communications Performance in the Presence of Narrowband Jamming and Interference", *IEEE Transactions–on–Communications*, vol. COM–26, Feb., pp. 209–216, 1978.
Li, L., and Milstein, L.B., "Rejection of Narrowband Interference in PN Spread Systems Using Transversal Filters", IEEE Transactions–on–Communications, vol. COM–30, May, pp. 925–928, 1982.
Iltis, R.A., and Milstein, L.B., "Performance Analysis of Narrowband Interference Rejection Techniques in DS Spread Spectrum Systems," *IEEE Transactions–on–Communication*, vol. COM–32. Nov., pp. 1169–1177, 1984.

* cited by examiner

*Primary Examiner*—Khai Tran
*Assistant Examiner*—David B. Lugo
(74) *Attorney, Agent, or Firm*—Dorsey & Whitney LLP

(57) ABSTRACT

A digital data communication overlay system is disclosed which is overlaid on a predefined frequency band of an existing analog data communication system. The digital data communication overlay system comprises a digital mobile unit and a digital ground station. The digital mobile unit and the digital ground station are configured to transmit and receive spread spectrum digital data communication signals between each other over the same spread spectrum digital channel. This is done by spreading the spread spectrum digital data communication signals over the predefined frequency spectrum of the existing analog data communication system.

30 Claims, 23 Drawing Sheets

MOBILE SEPARATION REQUIREMENT FOR ACCEPTABLE AM SIR.

BER OF DATA LINK WITH AND WITHOUT REED-SOLOMON CODING.

| Hop Time Epoch | C₁ | C₂ | C₃ | C₄ | C₅ |
|---|---|---|---|---|---|
| T₁ | F₁ | F₂ | F₃ | F₄ | F₅ |
| T₂ | F₅ | F₁ | F₂ | F₃ | F₄ |
| T₃ | F₄ | F₅ | F₁ | F₂ | F₃ |
| T₄ | F₃ | F₄ | F₅ | F₁ | F₂ |
| T₅ | F₂ | F₃ | F₄ | F₅ | F₁ |

Fig. 18

SPREAD SPECTRUM DIGITAL DATA COMMUNICATION OVERLAY SYSTEM AND METHOD

1. TECHNICAL FIELD OF THE INVENTION

The present invention is generally related to wireless communication systems and methods. In particular, the present invention pertains to a wireless digital data communication overlay system and method for providing spread spectrum digital channels (i.e., data links) that are overlaid on a frequency band dedicated to an existing wireless analog data communication system.

2. BACKGROUND OF THE INVENTION

In the existing commercial aviation communication system, the capabilities of aircraft have been stifled by the lack of ability to send digital data between aircraft and/or ground stations. In fact, there are currently no means for general purpose digital data communication in the VHF (very high frequency) band dedicated to this system and covering the frequency spectrum (i.e., bandwidth) between 108 and 136 MHz. This is primarily due to the lack of available spectrum in the VHF band.

One of the major benefits of having digital data communication between aircraft and ground stations is the increase in aviation safety. It is also highly desirable to have digital data communication because of the vast array of new services that can be offered to the commercial aviation industry. Table 1 shows the services currently available without digital data communication and the services that would be available with digital data communication.

TABLE 1

| Service (i.e., Communication Type) | Without | With |
|---|---|---|
| Voice | X | X |
| Message Queuing | | X |
| Message Prioritization | | X |
| Message Authentication | | X |
| Message Addressing | | X |
| Message Encryption | | X |
| Passive Hand-overs | | X |
| ATIS (Automated Terminal Information Service) | X | X |
| Basic Weather Radar | | X |
| Collision Avoidance | | X |
| Position Triangulation | | X |
| Airborne Weather Station | X | X |
| Ground Radar Back-Up | | X |
| Aircraft Position Location | | X |
| DME Functions | | X |

Completely switching to a new digital data communication system poses many problems. For example, it is not practical to force aircraft owners and small airports to sacrifice their investment in current avionics and purchase replacement avionics overnight. Moreover, any aircraft in flight or in operation on the ground at a landing facility that does not transition to the new system posses a serious threat to itself and other aircraft. The potential for mid-air collisions and collisions on the ground is unacceptable in this case.

Therefore, for practical and safety reasons, a migration path to the new system is needed which does not disrupt operation of the existing commercial aviation communication system. The simplest way to provide such a migration path is through coexisting communication systems. In this way, a new digital data communication systems can be added to the existing avionics communication system and users can naturally migrate to the new system as their budgets allow.

One solution for migrating to a digital data communication system is to add digital channels in the VHF frequency band, as proposed in "VHF Air-Ground Communication", Document No. RTCA/SC-172, Washington, D.C., 1994. In this solution, existing AM communication and/or navigation channels in the 108 to 118 MHz frequency band would be de-allocated and then re-allocated for digital channels. These digital channels could be used for both vocal and data digital data communication.

There are several draw backs to this solution. First, presently allocated channels must be de-allocated. This disrupts existing communication and makes the task of updating and switching the industry very costly. In addition, anyone who is unaware of the change will not be able to communicate properly. This presents the opportunity for disaster. Second, existing equipment will become obsolete. This will cause costly avionics upgrades to be made to all aircraft and ground units. This poses a problem to the airlines and especially to the small airline operator and general aviation industry. Scraping the existing equipment can be avoided if existing channels are relocated. But, as just mentioned, this is undesirable.

3. SUMMARY OF THE INVENTION

In summary, the present invention is a digital data communication overlay system and corresponding method. The digital data communication overlay system is overlaid on a predefined frequency band of an existing analog data communication system and comprises digital data communication units. The digital data communication units are configured to transmit and receive spread spectrum digital data communication signals between each other over the same spread spectrum digital channel. This is done by spreading the spread spectrum digital data communication signals over the predefined frequency spectrum of the existing analog data communication system.

4. BRIEF DESCRIPTION OF DRAWINGS

Figure 1:
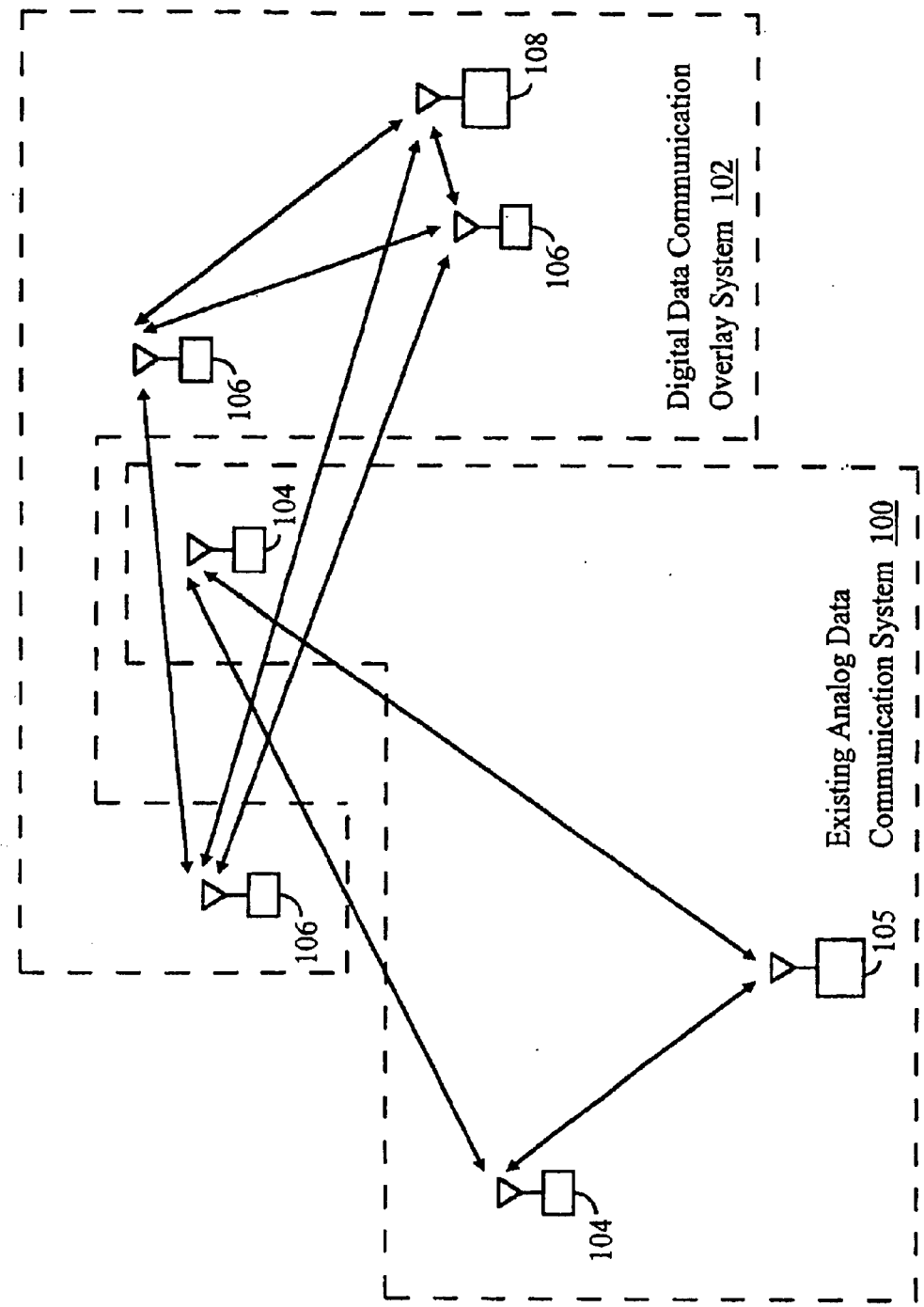
FIG. 1 is a block diagram of a wireless digital data communication overlay system (hereafter "digital overlay system") that is overlaid on an existing wireless analog data communication system (hereafter "analog system") in accordance with the present invention.
Figure 9:
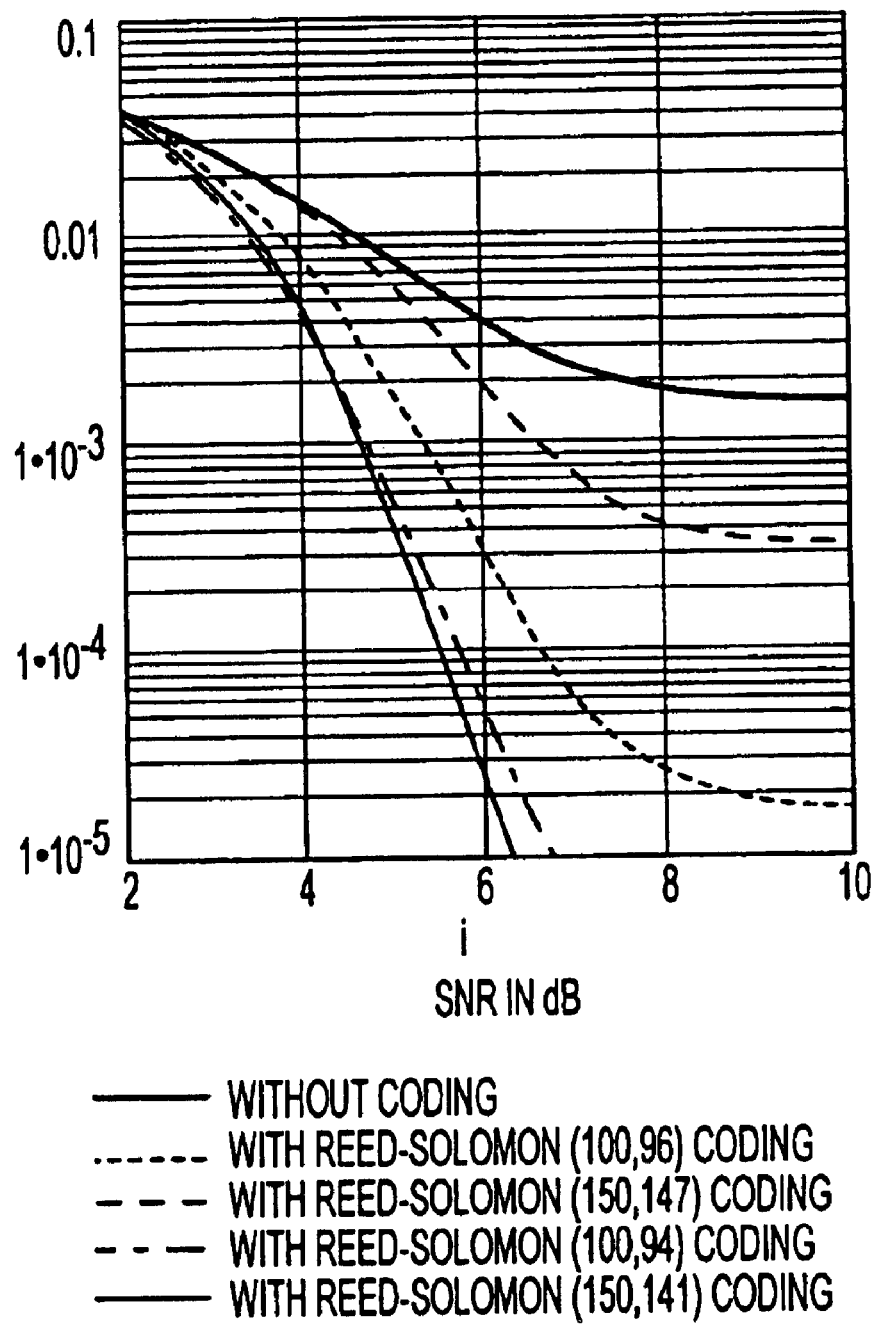

FIG. 9 provides BER curves for various modulation schemes and various types of FEC codings for the forward DSSS data link in the DSSS implementation of the digital overlay system of FIG. 1.

Figure 10:
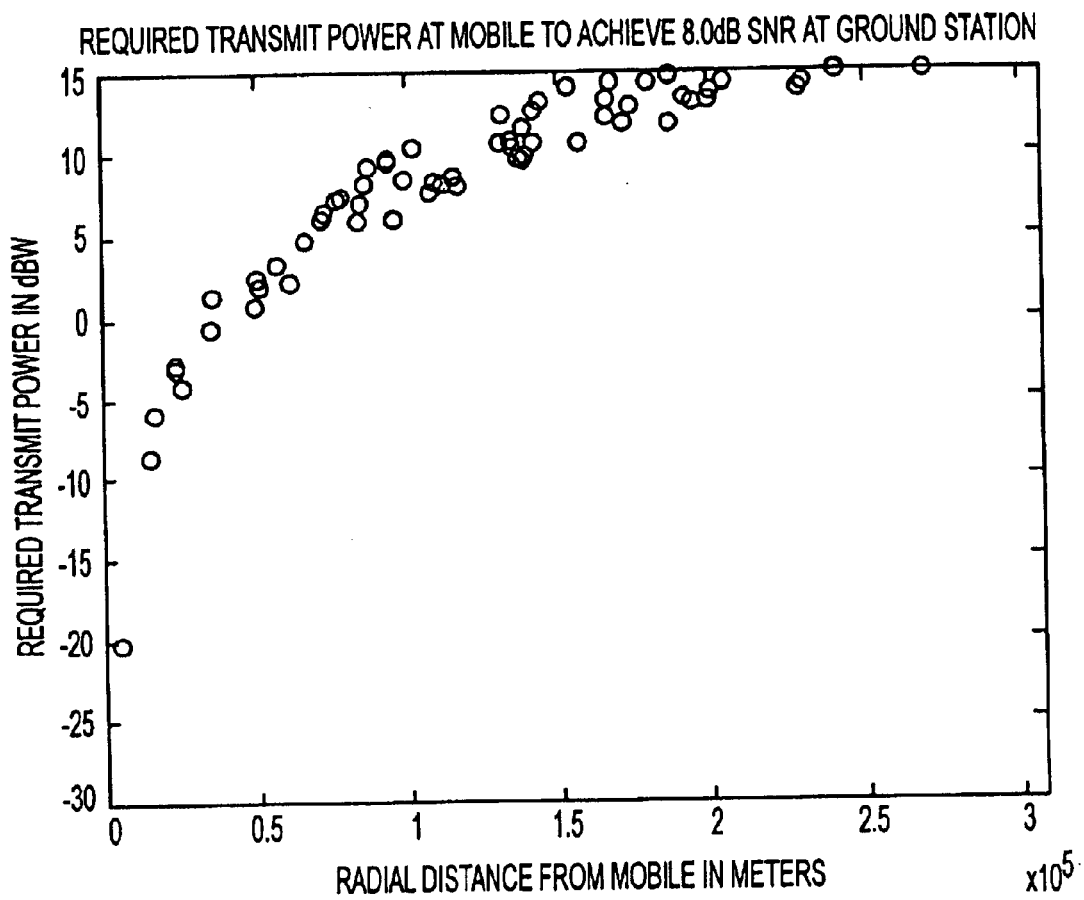

FIG. 10 shows the required transmit power of a digital mobile unit of the digital overlay system of FIG. 1 as a function of the radial distance to a digital ground station of the digital overlay system.

Figure 11:
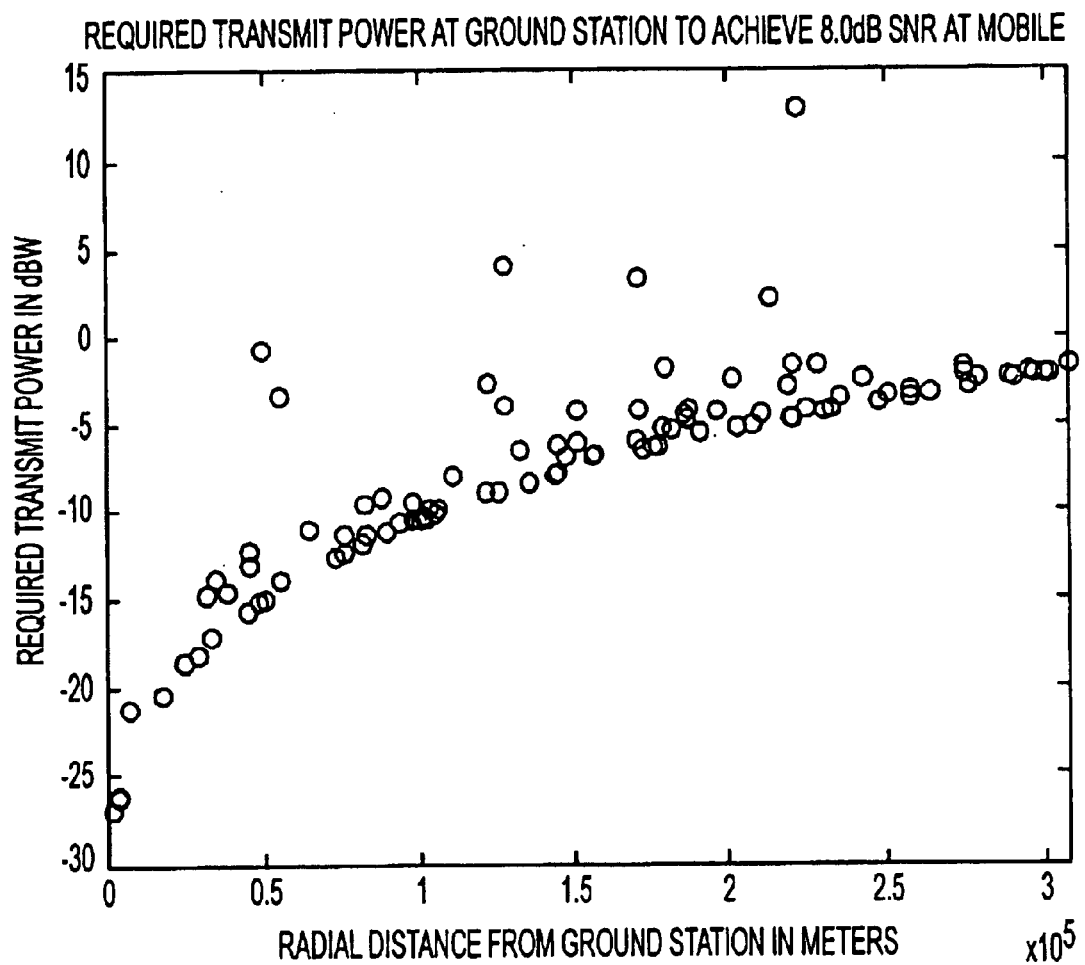

FIG. 11 shows the required transmit power of a digital ground station of the digital overlay system of FIG. 1 as a function of the radial distance to a digital mobile unit of the digital overlay system.

Figure 12:
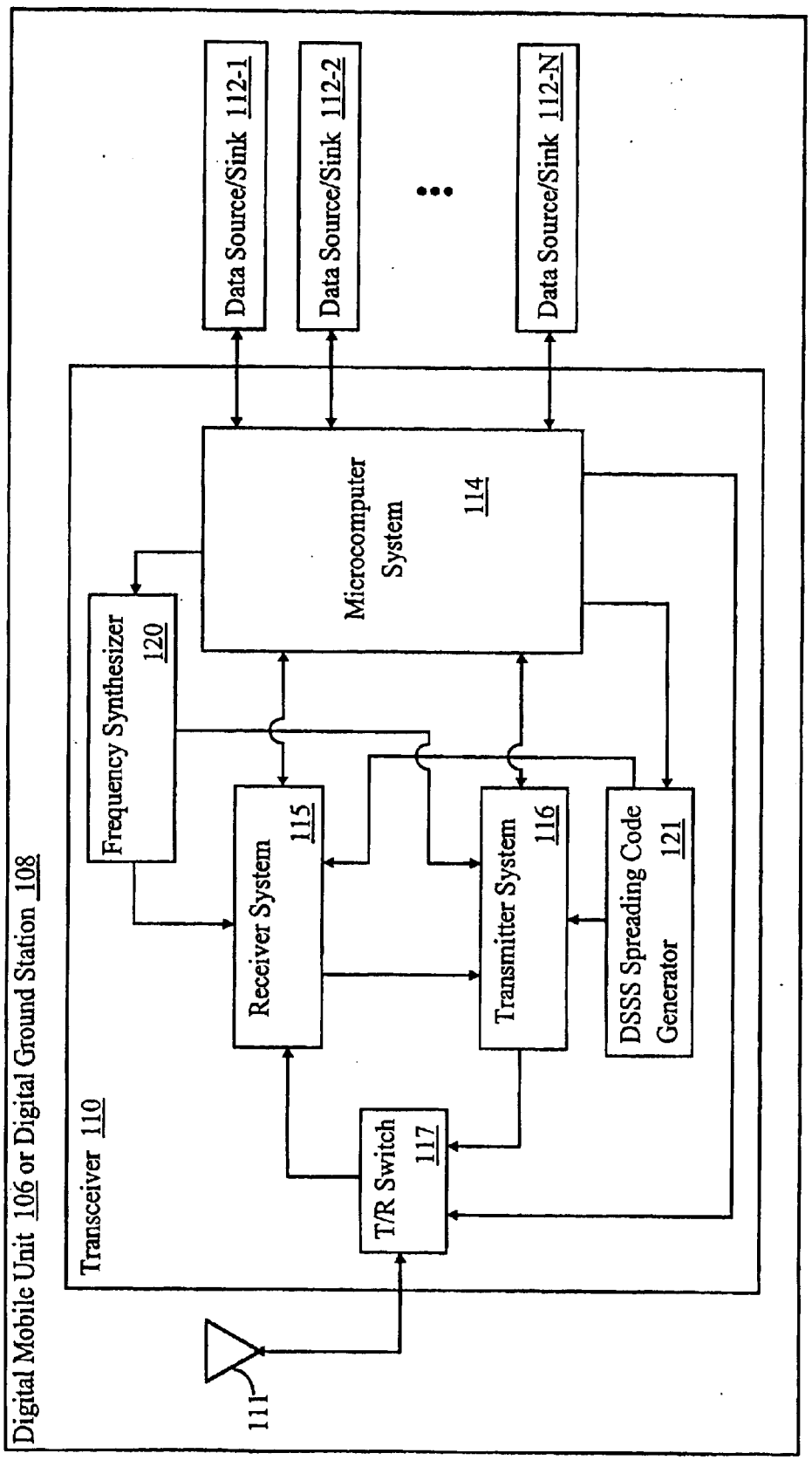

FIG. 12 shows a block diagram of an exemplary configuration of each digital mobile unit or ground station of the digital overlay system of FIG. 1 in the DSSS implementation of the digital overlay system.

Figure 13:
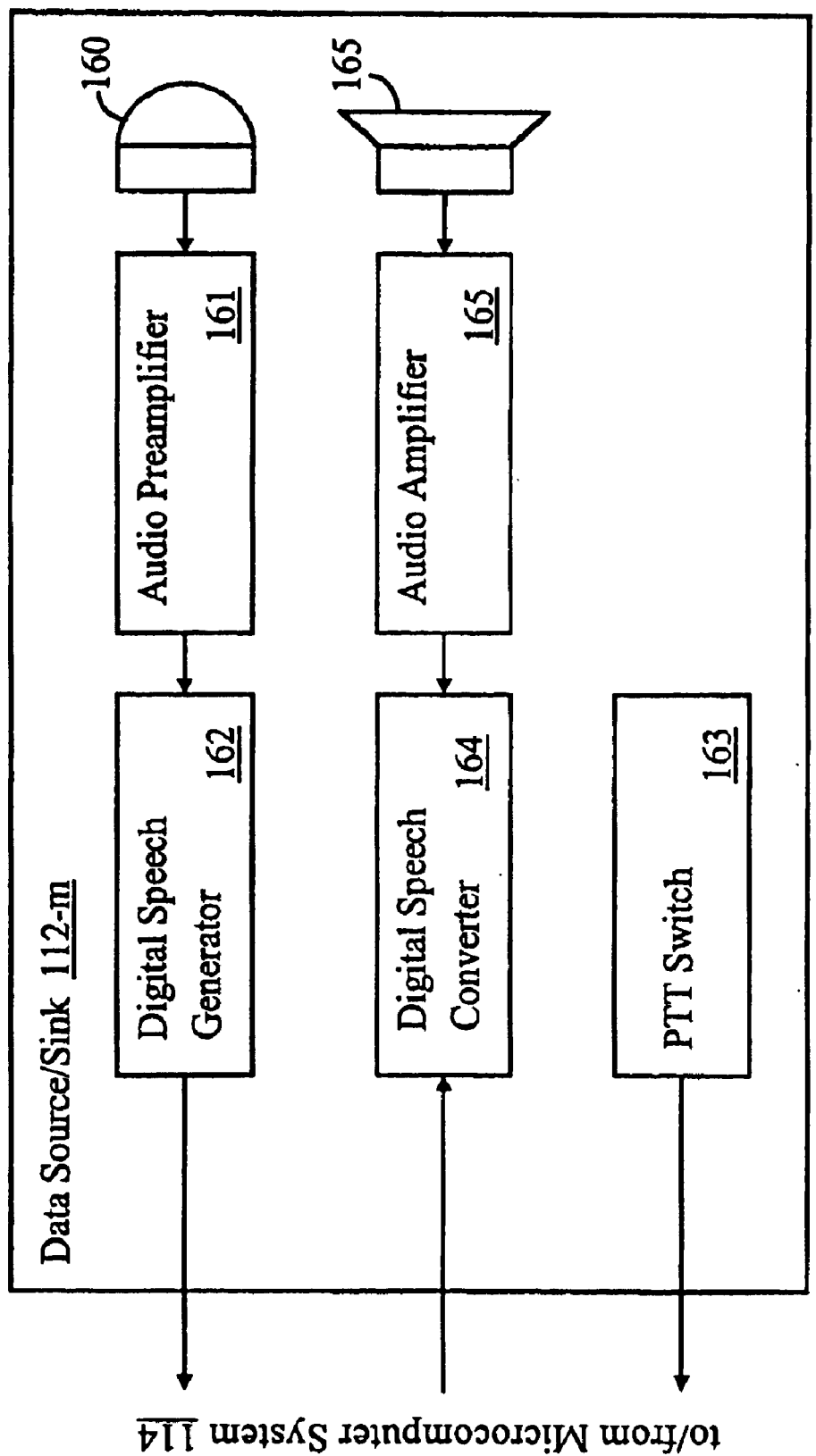

FIG. 13 shows a block diagram of an exemplary configuration for a digital data sink/source in each digital mobile unit or ground station of FIG. 12.

Figure 14:
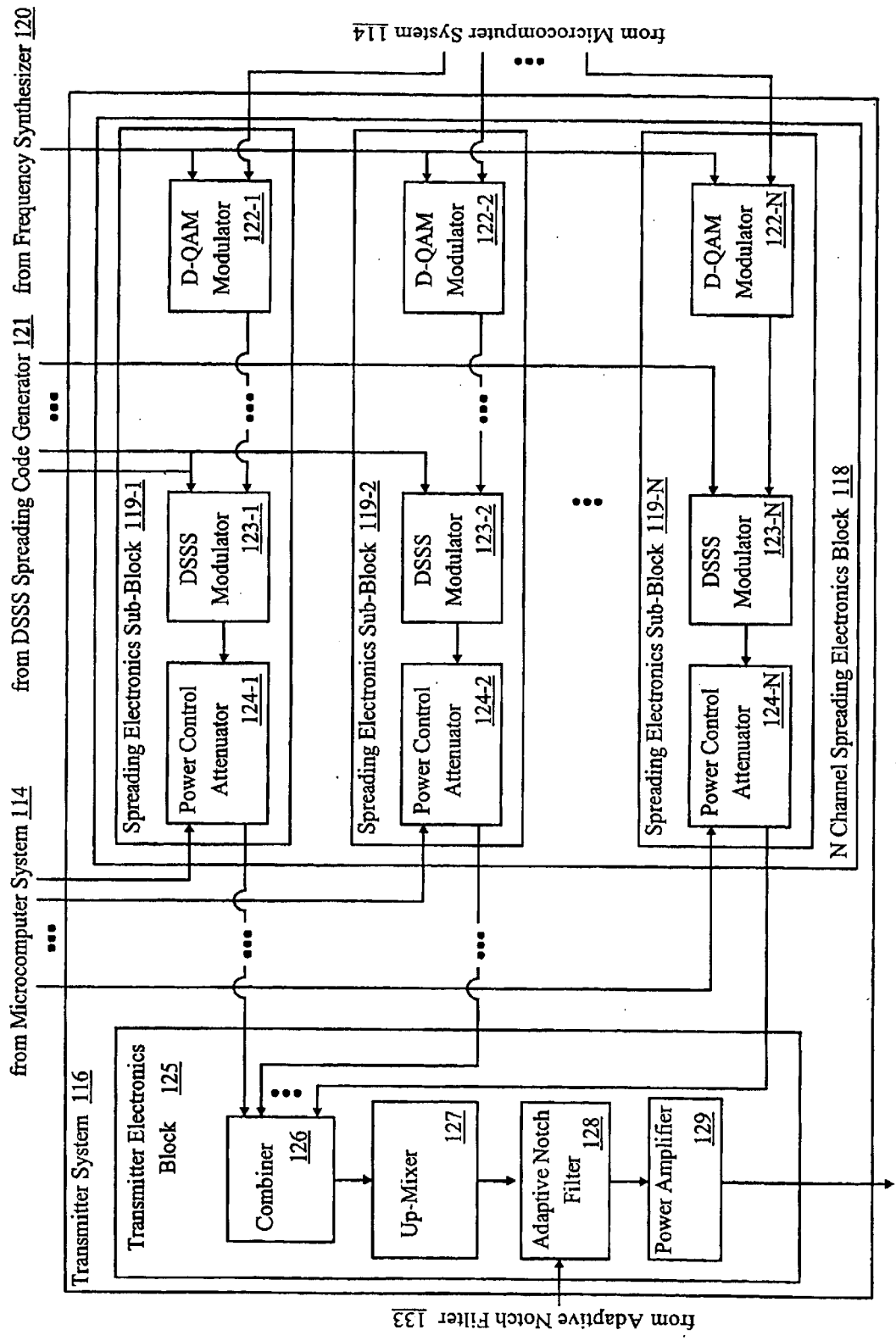
Figure 16:
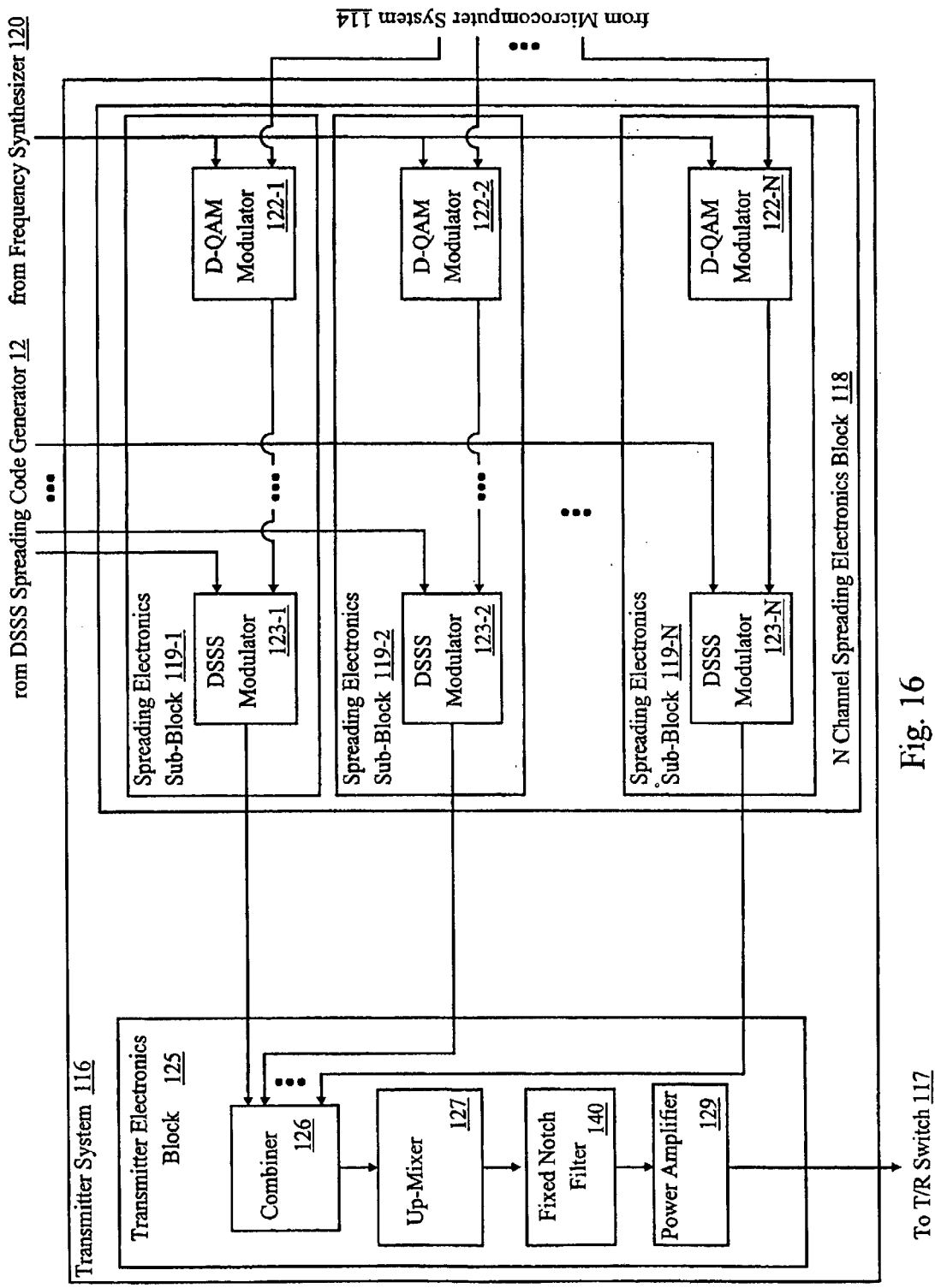

FIGS. 14 and 16 show possible configurations for the transmitter systems in the digital mobile unit and ground station of FIG. 12.

Figure 15:
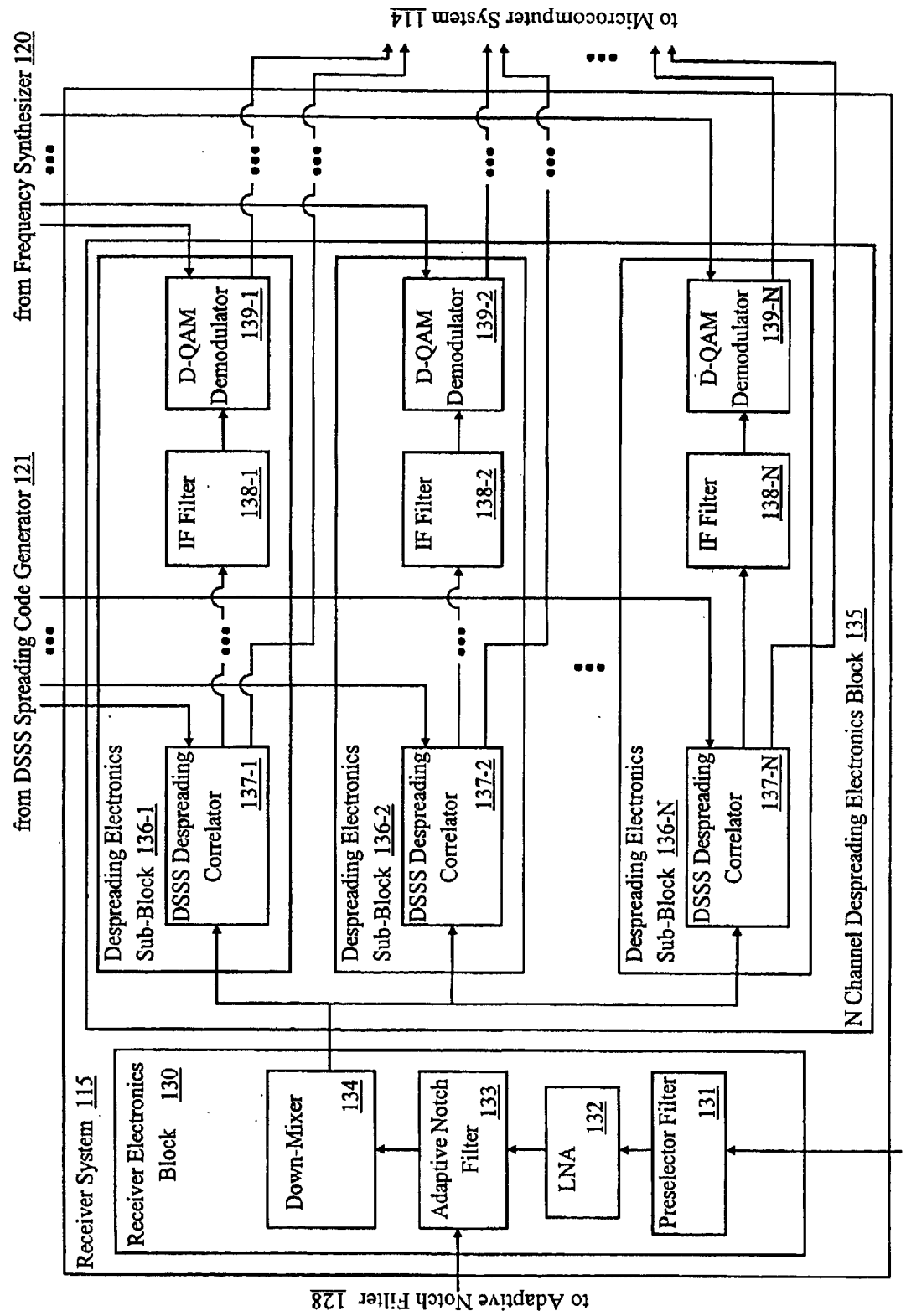
Figure 17:
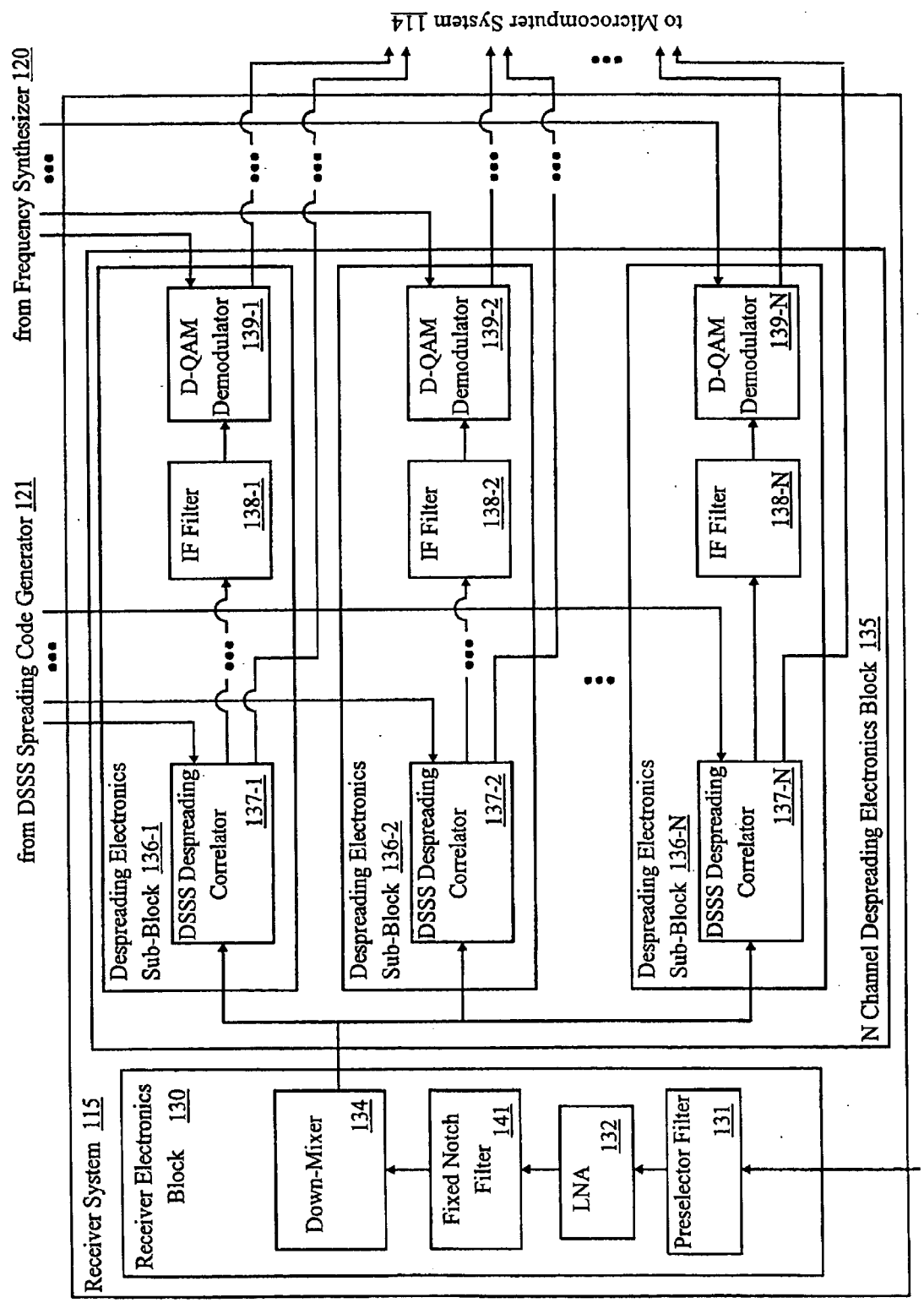

FIGS. 15 and 17 show possible configurations for the receiver systems in the digital mobile unit and ground station of FIG. 12.

FIG. 18 provides an example of the FHSS scheme used in the FHSS implementation of the digital overlay system of FIG. 1.

Figure 19:
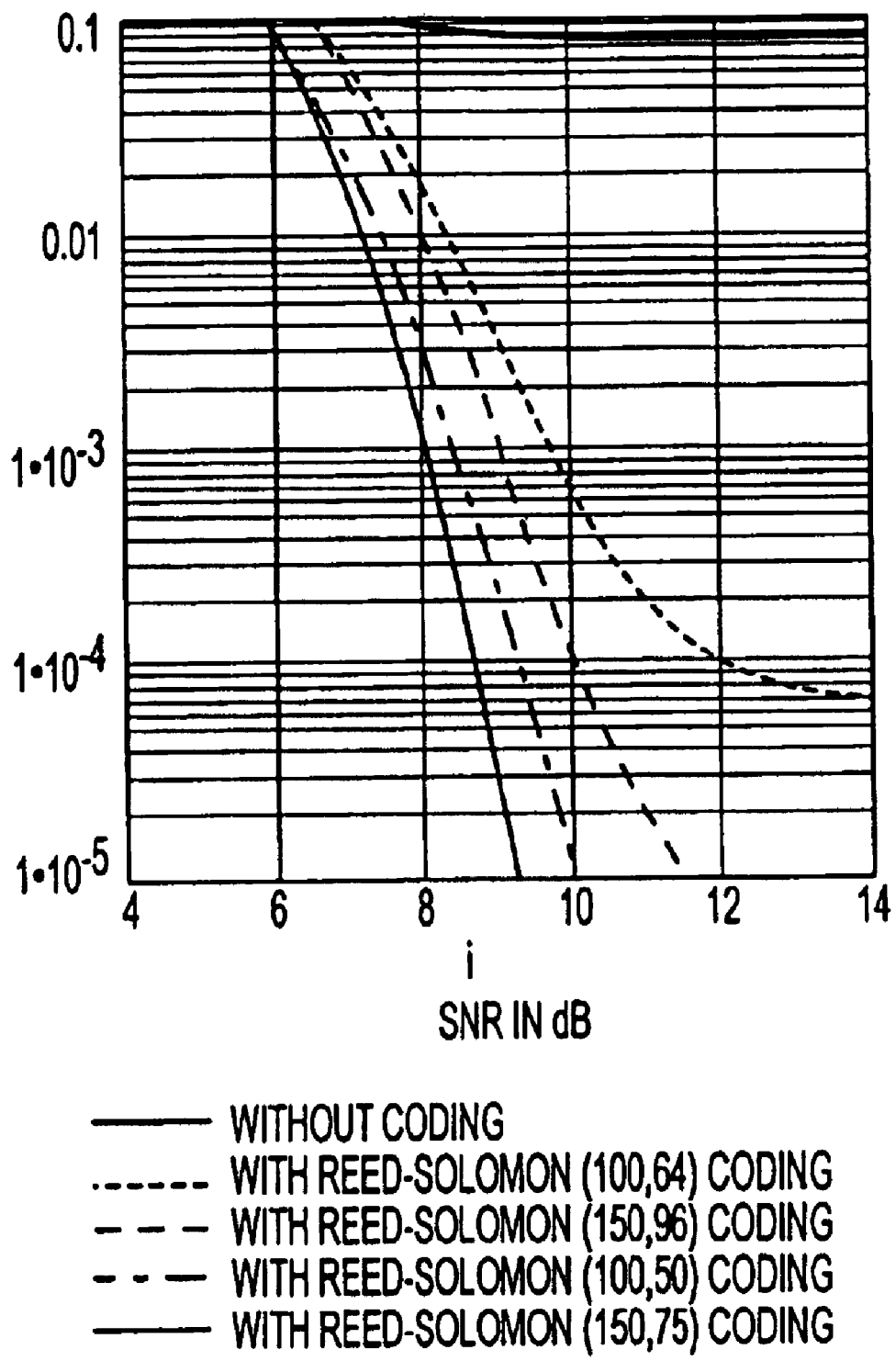

FIG. 19 provides BER curves for various modulation schemes and various types of FEC codings for the forward FHSS data link in the FHSS implementation of the digital overlay system of FIG. 1.

Figure 20:
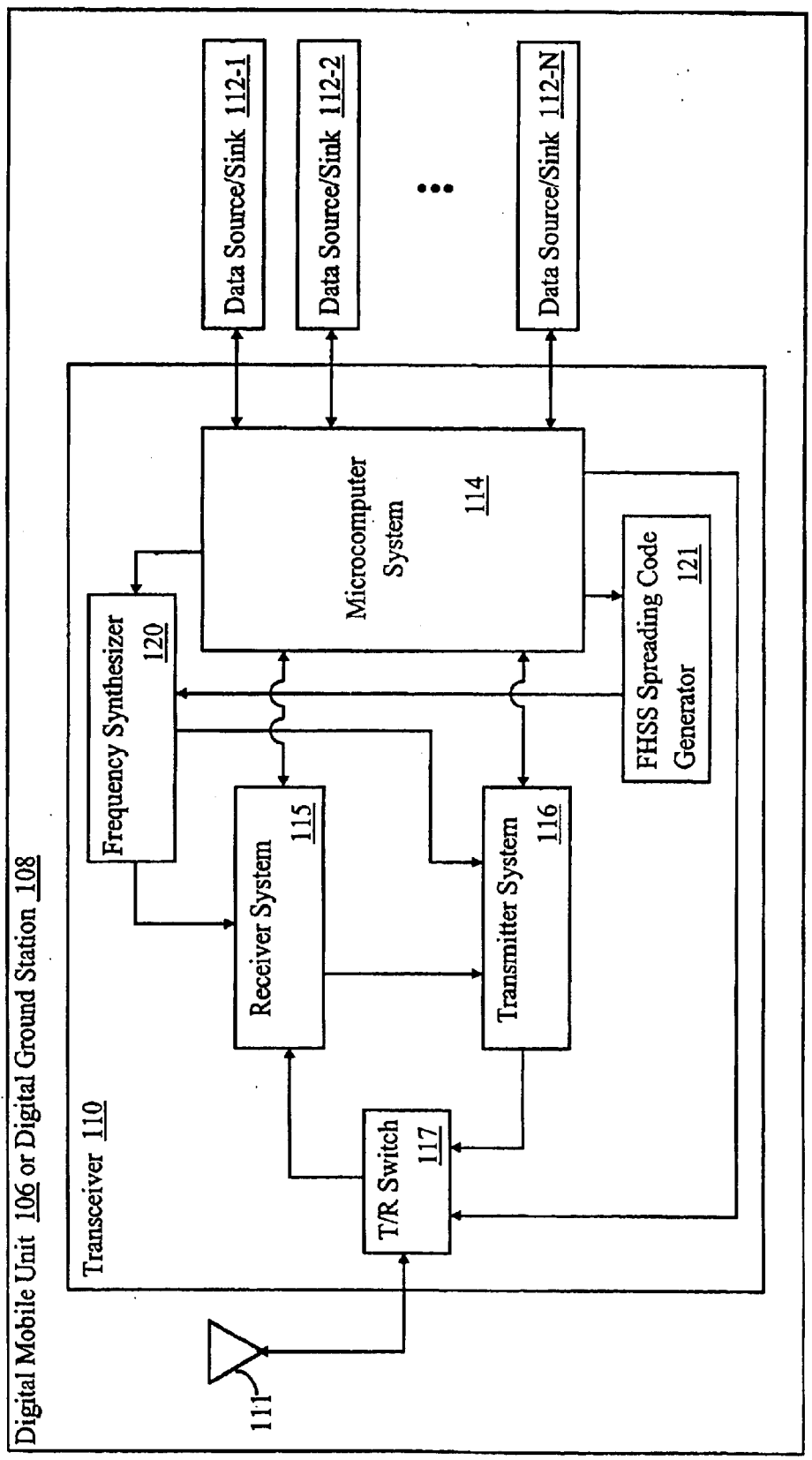

FIG. 20 shows a block diagram of an exemplary configuration of each digital mobile unit or ground station of the digital overlay system of FIG. 1 in the FHSS implementation of the digital overlay system.

Figure 21:
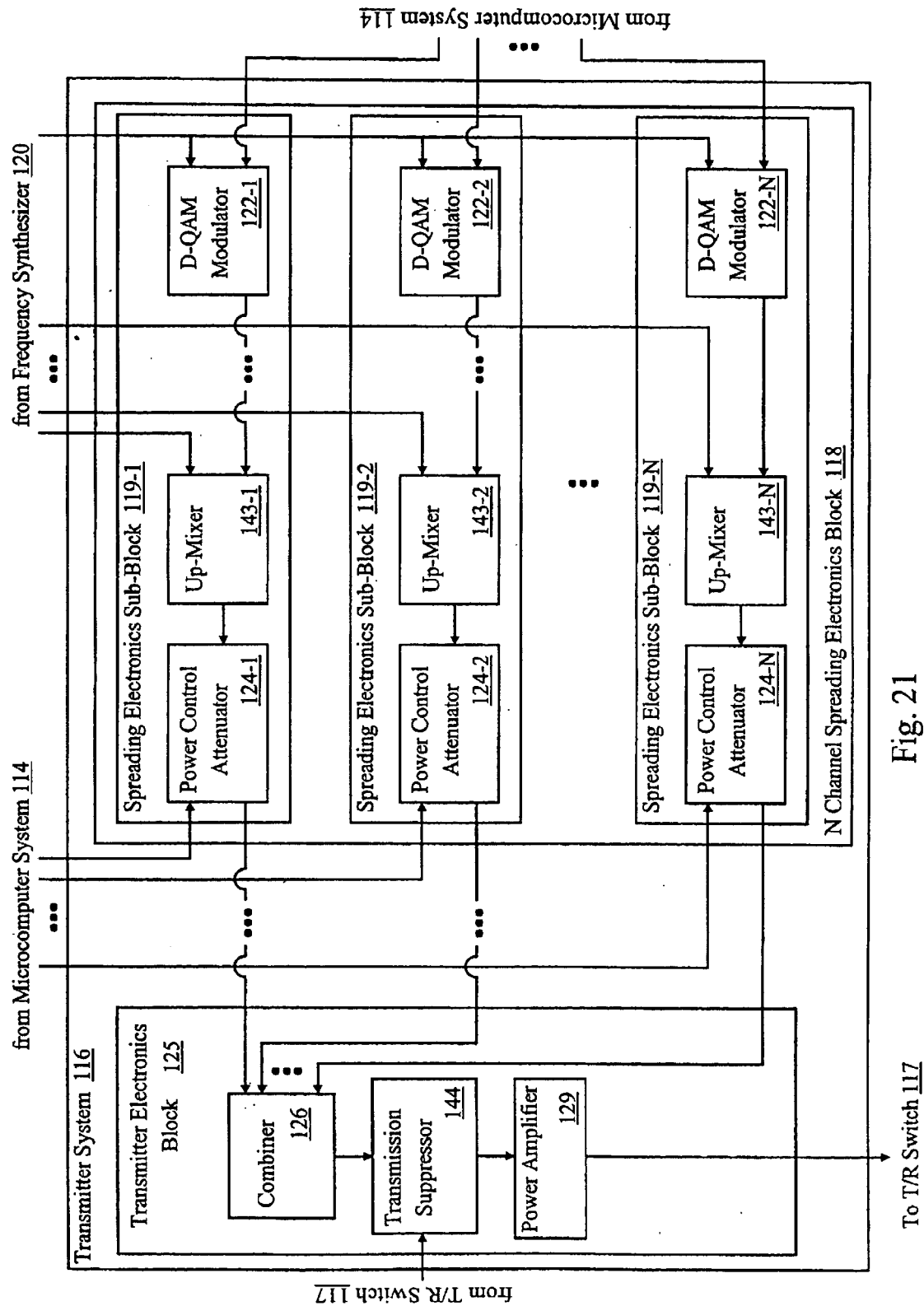
Figure 23:
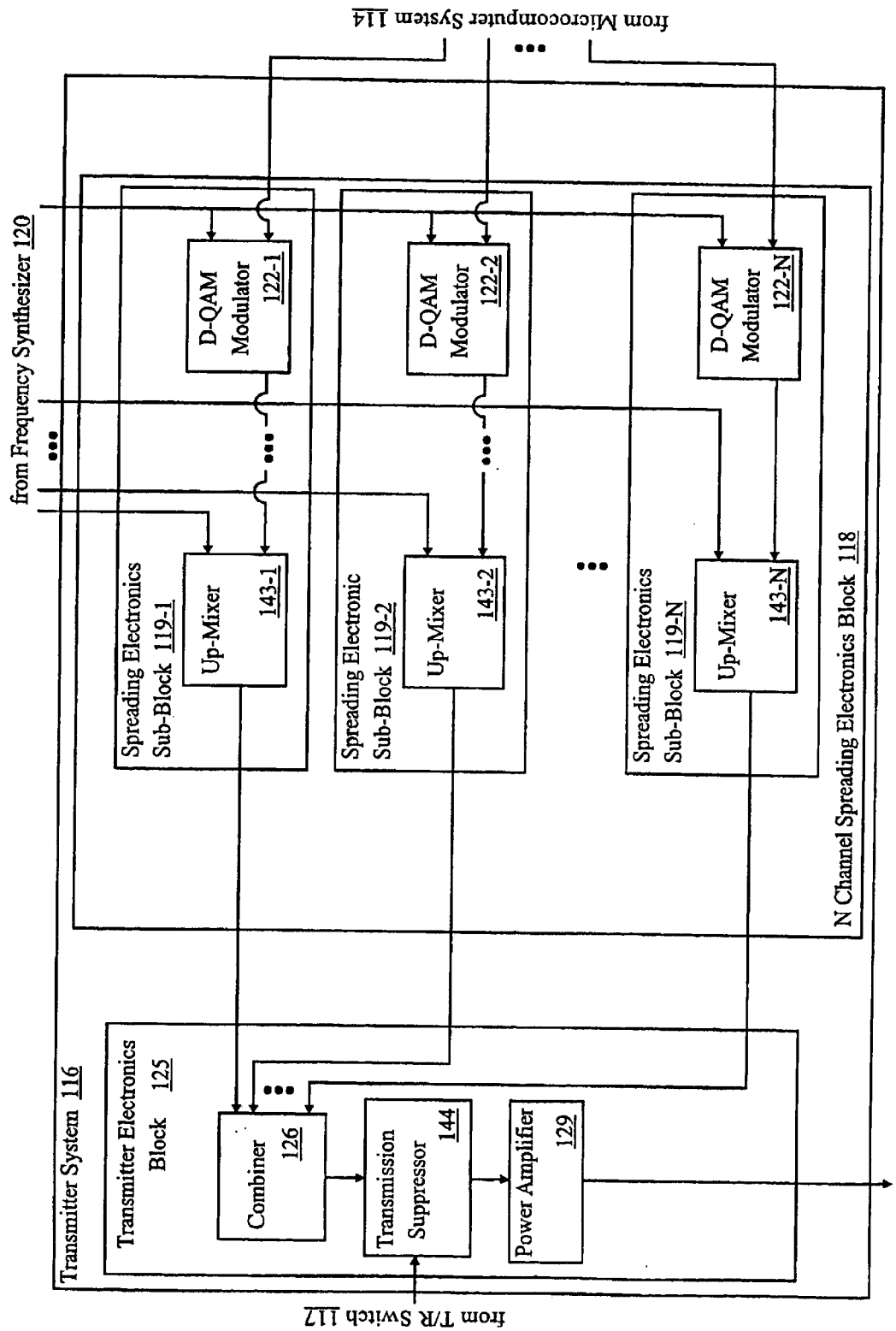

FIGS. 21 and 23 show possible configurations for the transmitter systems in the digital mobile unit and ground station of FIG. 20.

Figure 22:
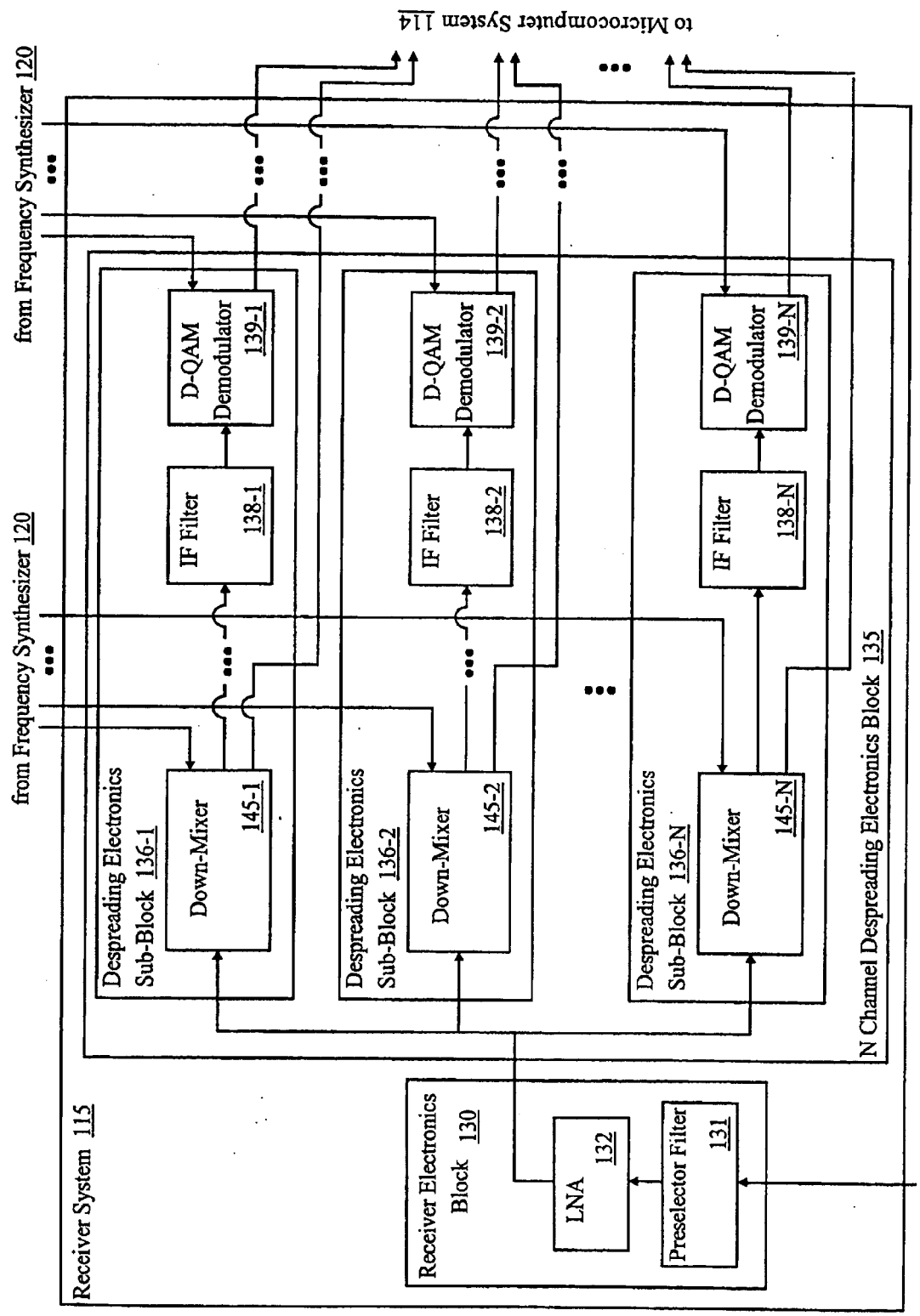

FIG. 22 shows a possible configuration for the receiver systems in the digital mobile unit and ground station of FIG. 20.

5. DETAILED DESCRIPTION OF THE INVENTION

Referring initially to FIG. 1, there is shown an existing wireless analog data communication system (hereafter "analog system") 100 that includes conventional analog data communication units, such as analog data communication mobile units (hereafter "analog mobile units") 104 and an analog data communication ground station (hereafter "analog ground station") 105. The analog mobile units and ground station enable analog data communication, such as AM (amplitude modulation) voice communication, to be made between them. This is done by transmitting analog data communication signals (hereafter "analog signals") between them over analog data communication channels (hereafter "analog channels") in a predefined frequency band specifically dedicated to the existing analog system. Each analog channel occupies a corresponding smaller frequency band within the existing analog system's large frequency band.

FIG. 1 also shows a wireless spread spectrum digital data communication overlay system (hereafter "digital overlay system") 102 that is overlaid on and coexists with the analog system 100. The digital overlay system includes digital data communication units, such as digital data communication mobile units (hereafter "digital mobile units") 106 and a digital data communication ground station (hereafter "digital ground station") 108. The digital mobile units and ground station establish spread spectrum digital data communication channels or data links (hereafter "digital channels") between them. This enables digital data communication between the digital mobile units and ground station to be made by transmitting spread spectrum digital data communication signals (hereafter "digital signals") between them over the digital channels. The digital data communication may be in the form of voice communication, video communication, and/or other types of communication, such as those described in Table 1. The digital ground station and the analog ground station 105 may be integrated together or located together, as might be the case if the analog data communication system 100 is the current commercial aviation communication system.

The digital channels are overlaid on the frequency band of the existing analog system 100. The digital signals are transmitted over the digital channels by spreading them over the existing analog system's frequency band using spreading codes. This may be over the entire spectrum of the frequency band or a selected portion of it (i.e., a selected frequency band within the existing analog system's frequency band). Each digital channel has a corresponding unique spreading code for spreading the digital signals transmitted over the digital channel. In this way, analog data communication in the existing analog system are not interrupted. This will become more evident from the detailed discussions of the digital overlay system in sections 5.A to 5.C.6.

5.A. Operation Overview

The digital overlay system 102 can be implemented using either DSSS (direct sequence spread spectrum) or FHSS (frequency hopped spread spectrum) schemes like those used in conventional CDMA (code division multiple access) systems. However, unlike a CDMA system, the digital overlay system 102 does not separate the forward link and reverse link digital signals in frequency. Instead, it separates them in time using a 50% duty cycle TDM (time division multiplexing) scheme. This provides alternating forward and reverse link time slots (or frames) for forward and reverse link digital signals that are transmitted over the same digital channel by spreading them with the same spreading code.

Figure 2:
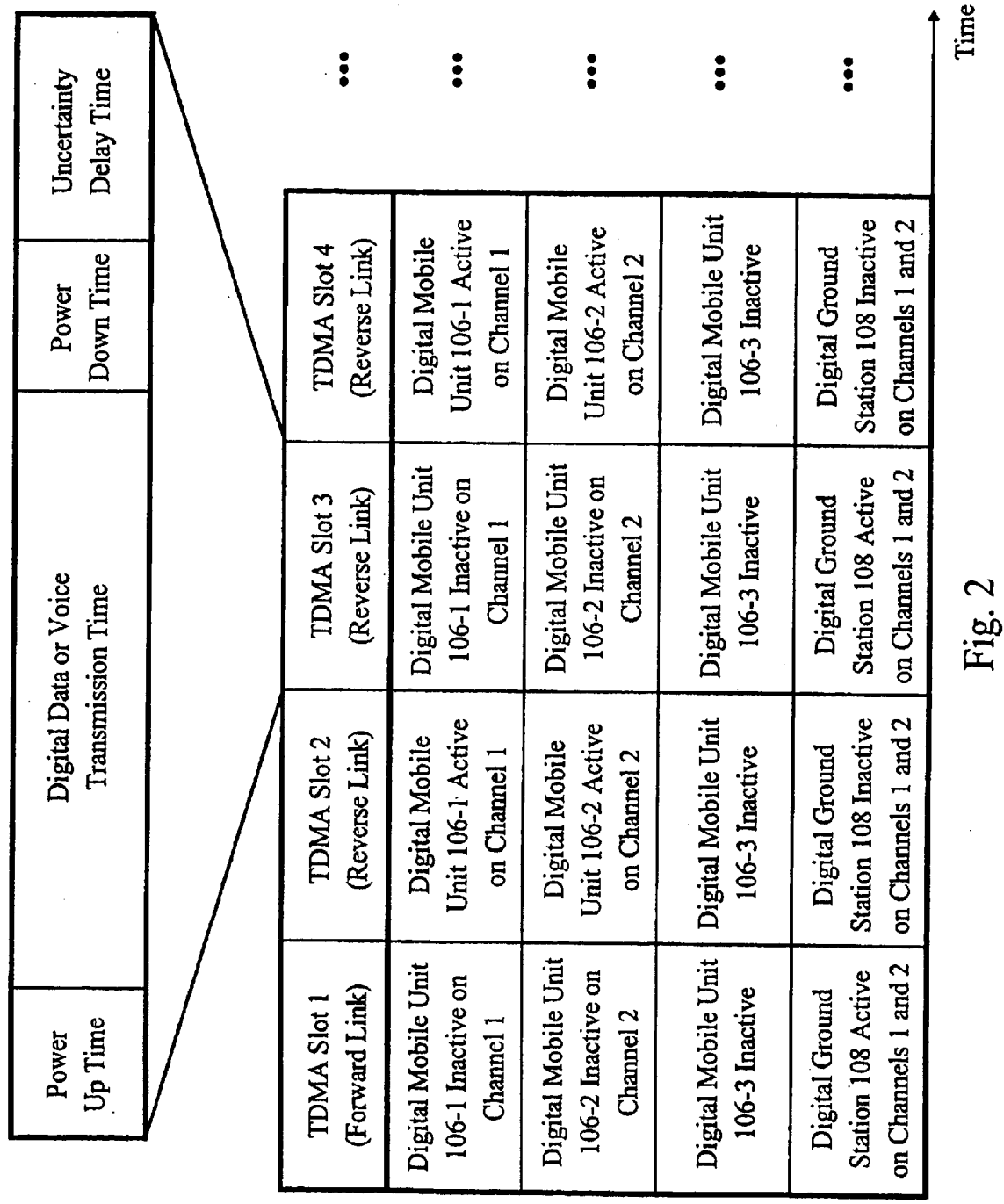
FIG. 2 illustrates the TDM (time division multiplexing) scheme of the digital overlay system of FIG. 1.

For example, referring to FIG. 2, the digital mobile units 106 may include three digital mobile units 106-1, 106-2, and 106-3. Here, digital data communication is currently occurring between the digital ground station 108 and the digital mobile units 106-1 and 106-2, but not between the digital ground station 108 and the digital mobile unit 106-3. Specifically, during the reverse link time slots, the digital ground station 108 is inactive and the digital mobile units 106-1 and 106-2 are active and transmit digital signals to the digital ground station respectively over channels 1 and 2. During the forward link time slots, the digital mobile units 106-1 and 106-2 are inactive and the digital ground station is active and transmits digital signals to the digital mobile units 106-1 and 106-2 respectively over channels 1 and 2.

During both the reverse and forward link time slots, the digital mobile unit 106-3 is inactive and does not transmit any digital signals to the ground station 108. In this example, the digital mobile units 106-1 and 106-2 may in fact be communicating between each other via the digital ground station 108.

FIG. 2 also shows how the time within a time slot may be allocated. Time is allocated to allow the digital mobile units 106 and the digital ground station 108 to power up and down for transmission. Time is also allocated for transmitting the digital data. Finally, time is allocated to the uncertainty delay between transmission and reception of the data so that the digital mobile units and ground station do not transmit and receive simultaneously. The longer the time slots are, the smaller percentage this delay will impact the efficiency of the design. But, the time slot length must be short enough to be acceptable in real time voice communication.

For example, an interruption of 60 ms or less is not objectionable to the human user and therefore may be used as the standard time slot length. Assuming an operational range (i.e., radial distance) of 370 km, the delay from transmission until reception is about 1.234 ms (i.e., 370 km/3.00× $10^8$ m/s). In this case, a 3 ms uncertainty delay time and 0.5 ms power up and down times could be used for which the resulting slot efficiency is 93.3%.

The digital overlay system 102 can be configured for various implementations. For example, in one implementation the digital overlay system may configured so that digital data communication occurs directly between a digital ground station 108 and a digital mobile unit 106. In this way, two digital mobile units can indirectly have digital data communication via a digital ground station 108 even though there is terrain between the two digital mobile units that would otherwise block digital data communication between them. This would particularly useful where the analog system 100 is the current commercial aviation communication system. In another implementation, the digital overlay system can be configured so that digital data communication is made directly between digital mobile units 106 without the need of a digital ground station 108. In yet another implementation, the digital overlay system could be configured to handle direct digital data communication between a digital ground station and a digital mobile unit and direct digital data communication between digital mobile units.

Moreover, for unidirectional digital data communication in the digital overlay system 102, pre-selected digital channels with pre-assigned spreading codes could be used. For example, where the analog system 100 is the current commercial aviation communication system, a digital ground station 108 may be used for unidirectional transmission of digital signals containing information for a specific service, such as weather information for a weather service, to a digital mobile unit 106.

However, for bidirectional digital data communication, a pre-selected digital channel with a corresponding spreading code could be used as an access digital channel for initial digital data communication. In this case, a set of other pre-selected digital channels with corresponding spreading codes could be used as assignable digital channels for the remaining digital data communication.

For example, the access channel could be used for initial direct digital data communication between a digital mobile unit 106 and a digital ground station 108. During these initial digital data communication over the access digital channel, the digital ground station would assign a currently un-assigned digital channel for the remaining direct digital data communication between the digital mobile unit and the digital ground station. This is done by identifying the corresponding spreading code for the assigned digital channel. Then, the digital mobile unit and the digital ground station switch to the assigned digital channel for the remaining digital data communication.

As another example, two digital mobile units 106 could use the access channel for initial direct digital data communication between them in order to switch to an un-assigned digital channel. The remaining direct digital data communication between the digital mobile units would then occur over the assigned digital channel. In this case, one of the digital mobile units could act as a digital ground station in assigning the digital channel and in transmitting digital signals during the forward link time slot instead of the reverse link time slot.

In a variation of the foregoing examples, a digital ground station 108 could be used to assign an unassigned digital channel to two digital mobile units 106. Similar to the first example, this would be done using initial direct digital data communication between the digital ground station 108 and the respective digital mobile units. Then, like the second example, the remaining digital data communication would occur directly between the digital mobile units over the assigned digital channel. The digital ground station would therefore also assign which digital mobile unit would transmit digital signals during the forward link time slot instead of the reverse link time slot.

Furthermore, as mentioned earlier, the spreading of the digital signals over the frequency band of the existing analog system 100 may be done over the entire spectrum of the frequency band or a selected portion of it. For example, where the analog system 100 is the current commercial aviation communication system, the VHF band is dedicated to the analog system. The VHF band roughly covers the frequency spectrum between 108 and 136 MHz and has existing analog channels that are 25 KHz wide. This entire frequency spectrum could be selected for spreading. However, it may be desirable to select only the frequency spectrum between roughly 120 MHz and 136 MHz because the frequency spectrum between 108 and 120 MHz may be reserved for backup digital data communication channels (hereafter "backup channels") where digital data communication is made with unspread digital data communication signals (hereafter "unspread signals"). Each backup channel would therefore occupy a corresponding frequency band in the spectrum between 108 and 120 MHz over which unspread signals are transmitted.

5.B. DSSS Implementation

Referring to FIG. 1, in the DSSS implementation of the digital overlay system 102 (hereafter "DSSS overlay system 102"), the DSSS overlay system is prevented from interfering with the existing analog system 100 primarily by spreading the digital signals (hereafter "DSSS signals") over the frequency spectrum of the existing analog system's frequency band using DSSS codes. Each DSSS code identifies a corresponding digital channel and is used to spread both the forward and reverse link DSSS signals transmitted over the digital channel. The selection of the appropriate DSSS codes is discussed in section 5.B.1.

There are several other important features that are used to enable the analog system and the DSSS overlay system to coexist. These other features are identified by addressing the near-far problem in sections 5.B.2 to 5.B.4 and their relationships are further discussed in section 5.B.5. Moreover, the digital mobile units 106 and the digital ground station 108 are configured in view of the features discussed in sections 5.B.1 to 5.B.5. The configuration of each digital mobile unit and the digital ground station are discussed respectively in sections 5.B.6 and 5.B.7.

5.B.1. DSSS Codes

The DSSS overlay system 102 enables digital data communication to take place at the same time and in the same frequency band as analog data communication in the existing analog system 100. This is achieved in the DSSS implementation by using the DSSS signals. The DSSS signals are very large in frequency bandwidth compared to the analog signals. Spreading the DSSS signals in this way reduces their power spectral density which reduces the amount that they interfere with the analog system.

There are several types of sets of DSSS codes that can be used to spread the DSSS signals over the frequency band of the analog system 100. Each type has unique cross-correlation and auto-correlation properties. Because of the time synchronization required by TDM, a set of DSSS codes with good auto-correlation properties is more important than one with good cross-correlation properties. Thus, an original version of a DSSS code with low auto-correlation side lodes and maximal length can be used to produce the set of DSSS codes used in the digital overlay system 102. Each DSSS code in the set is a unique time shifted version of the original version and is used to spread both the forward and reverse link DSSS signals transmitted between a digital mobile unit 106 and a digital ground station 108 over the corresponding digital channel.

Furthermore, the cross-correlation properties of the DSSS code become important when there are interfering transmissions from an adjacent DSSS overlay system 102. DSSS signals between DSSS overlay systems are not synchronized to one another. Therefore, using a set of DSSS codes with good cross-correlation properties will reduce the effect of these interfering transmissions.

5.B.2. Near-Far Problem in Analog Data Communication System from Interfering Digital Ground Station Because the existing analog system 100 is not in synchronization with the DSSS overlay system 102, DSSS signals will be transmitted by an interfering digital ground station 108 while analog signals are being received at a nearby analog mobile unit 104 or ground station 10. This may cause a near-far problem with the reception of analog signals at the receiving analog mobile unit or ground station 105. Namely, the DSSS signals transmitted by the digital ground station may over power the reception of analog signals at the analog mobile unit or ground station.

In this case, notch filtering of the DSSS signals transmitted by the digital ground station 108 may be particularly useful. This notch filtering suppresses the transmitted DSSS signals in the portions of the frequency spectrum over which analog signals are currently detected. The amount of frequency spectrum lost in the DSSS signals when they are suppressed is small since their large bandwidth adds redundancy. As a result, this spectrum loss has only a small impact on the ability of digital mobile units 106 to properly receive the DSSS signals. The notch filtering may be done at fixed portions of the spectrums since the frequencies used to transmit analog signals near the digital ground station will be generally known.

However, as the number of channels in which analog signals are detected increases, the amount of notch filtering also must increase. Once the notching reaches about 20% of the frequency spectrum of a DSSS signal, a digital mobile unit 106 will have problems properly receiving the DSSS signal. Thus, the number of channels being used determines, in part, the ability of the DSSS overlay system 102 to operate.

The notch filtering attenuation η required at a transmitting digital ground station 108 to provide an acceptable SIR (signal to interference ratio) is given by:

$$SIR=(P_{TA}-L_{TA})-(P_{TD}-G_P-L_{TD}-\eta) \quad (1)$$

Using the following assumptions:

The digital signal path loss $L_{TD}$=64 dB when the separation distance between the receiving analog mobile unit 104 or ground station 105 and the transmitting digital ground station 108 is at least 1000 ft The analog signal path loss $L_{TA}$=74 dB when the separation distance between the receiving analog mobile unit 104 and/or ground station 105 and the transmitting analog mobile unit 104 or ground station 105 is at most 3000 ft The power spectral density loss $G_P$=30 dB in the DSSS signals for a spreading gain ratio of 512:1

The maximum transmit power $P_{TD}$=20 dBW for the transmitting digital ground station 108

The maximum transmit power $P_{TD}$=20 dBW for the transmitting analog mobile unit 104 or ground station 105

The desired SIR=40 dB at the receiving analog mobile unit 104 or ground station 105 the required attenuation η according to Eq. 1 is 20 dB. This imposes only a modest notch filtering requirement on the transmitting digital ground station 108.

However, it should be noted here that the DSSS overlay system 102 is robust enough without notch filtering. Thus, although ultimate performance may be achieved with notch filtering, it is not required.

5.B.3. Near-Far Problem in Analog data communication System from Interfering Digital Mobile Units The near-far problem also exists in the case of an interfering digital mobile unit 106 that transmits DSSS signals. Spreading these DSSS digital signals, as discussed in section 5.B. 1, and adaptive notch filtering of their spectrum, in a similar manner to that discussed in section 5.B.2, will help attenuate the noise from the interfering digital mobile unit 106. Adaptive notch filtering may be used since the frequencies of analog signals change as a function of the location of the digital mobile unit 106 and therefore may not be known at a particular time. But, a practical physical separation must be kept between the interfering digital mobile unit 106 and the receiving analog mobile unit 104 or ground station 105 to keep the SIR acceptable at the analog mobile unit or ground station. This separation is easily achieved as will now be discussed.

Figure 3:
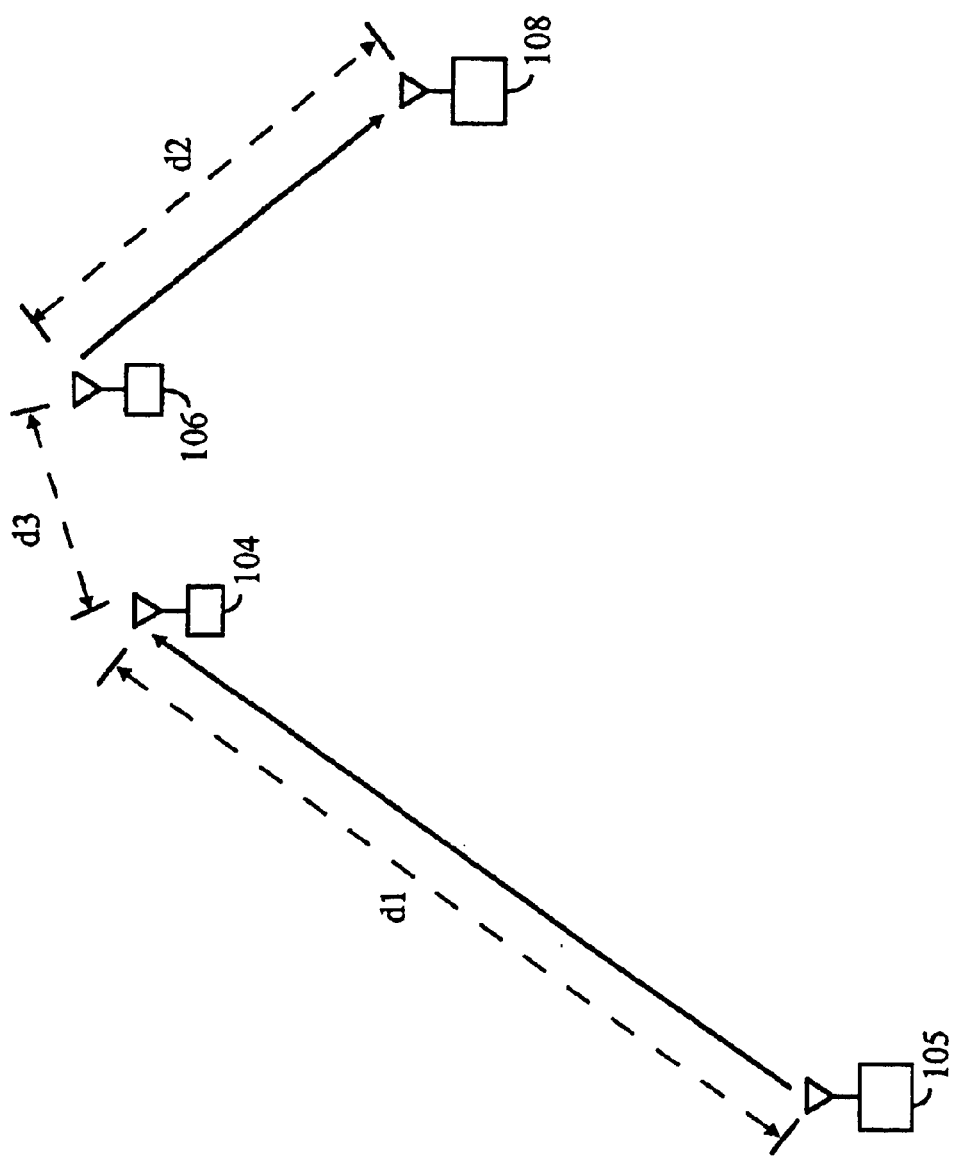
FIG. 3 shows the near-far problem in the analog system of FIG. 1 caused by an interfering digital mobile unit or ground station of the digital overlay system of FIG. 1 in a DSSS (direct sequence spread spectrum) implementation of the digital overlay system.

FIG. 3 illustrates the worst case for interference caused by DSSS signals being transmitted from an interfering digital mobile unit 106 to a digital ground station 108. These digital signals cause interference with the reception of analog signals being received at an analog mobile unit 104 from an analog ground station 105. Here, the digital and analog mobile units are separated from the digital and analog ground stations by the distances d2 and d1, respectively. In this case, there exists a minimum separation distance d3 between the digital and analog mobile units that will allow the analog mobile unit to receive the analog signals from the analog ground station with acceptable SIR. The worst case occurs with a large ratio d1:d3 because the transmit power of the digital mobile unit is at its highest relative to the transmit power of the analog ground station. Determining the minimum separation distance is particularly important when, as in the case where the existing analog system 100 is the current commercial aviation communication systems, safety is a major concern.

The minimum separation distance d3 is a function of the distance d1 between the analog mobile unit 104 and the analog ground station 105 and the distance d2 between the interfering digital mobile unit 106 and the digital ground station 108. Therefore, it is given by:

$$d_3 = (d_2 - d_1) \quad (2)$$

The SIR at the receiving analog mobile unit due to the interference from the interfering digital mobile unit is defined as:

$$P_{RA} - P_{RD1} \geq SIR \quad (3)$$

where $P_{RA}$ and $P_{RD1}$ are the receive powers at the receiving analog mobile unit in receiving the analog signals from the analog ground station and the DSSS signals from the interfering digital mobile unit. The receive power $P_{RA}$ is given by:

$$P_{RA} = P_{TA} - 10 \log[4\pi d_1/\lambda]^n \quad (4)$$

where $P_{RA}$ is the transmit power of the analog ground station in transmitting the analog signals and $[4\pi d_1/\lambda]^n$ is the signal path loss of these signals. Similarly, the receive power $P_{RD1}$ is given by:

$$P_{RD1} = P_{TD} - G_P - 10 \log[4\pi \cdot (d_2-d_1)/\lambda]^n - \eta \quad (5)$$

where $P_{TD}$ is the transmit power of the digital mobile unit in transmitting the DSSS signals, $[4\pi(d_1-d_2)/\lambda)]^n$ and $G_P$ are respectively the signal path and power spectral density losses of these signals, and $\eta$ is the attenuation from adaptive notch filtering at the interfering digital mobile unit. Finally, the transmit power $P_{TD}$ required is defined as:

$$P_{TD} = P_{RD2} + 10 \log[4\pi d_2/\lambda]^n \quad (6)$$

where $P_{RD2}$ is the receive power at the digital ground station in receiving the digital signals from the digital mobile unit and $[4\pi d_2/\lambda]^n$ is the signal path loss of these signals.

Here, it is important to note that, as will be explained in section 5.B.5, the transmit power $P_{TD}$ is controlled so that the receive power $P_{RD2}$ at the digital ground station 108 is constant. Thus, the transmit power decreases as the digital mobile unit 106 approaches the digital ground station and increases as the digital mobile unit moves away from the digital ground station.

After combining Eqs. 3 to 6 and manipulating the terms, the following expression results:

$$d_2 \leq \frac{(\lambda/4\pi)\sqrt[n]{10^{(-P_{TA}+P_{RD2}+SIR-G_P-\eta)/-10}} \, d_1}{(\lambda/4\pi)\sqrt[n]{10^{(-P_{TA}+P_{RD2}+SIR-G_P-\eta)/-10}} - d_1} \quad (7)$$

Eq. 7 is then substituted into Eq. 2 to determine the separation distance d3, as a function of the distance d1 between the analog mobile unit 104 and the analog ground station 105.

In determine the separation distance d3 in the manner just described, the following assumptions may be used:

The required receive power $P_{RD2} = -120$ dBW for the receiving digital ground station 108

The maximum transmit power $P_{TA} = 13$ dBW for the transmitting analog ground station 105

The desired SIR=20 dB at the receiving analog mobile unit 104

The wavelength $\lambda = 2.36$ m for a transmission frequency of 127 MHz

The adaptive notch filtering attenuation $\eta = 35$ dB

The path loss factor n=2 for the no multipath case

Figure 4:
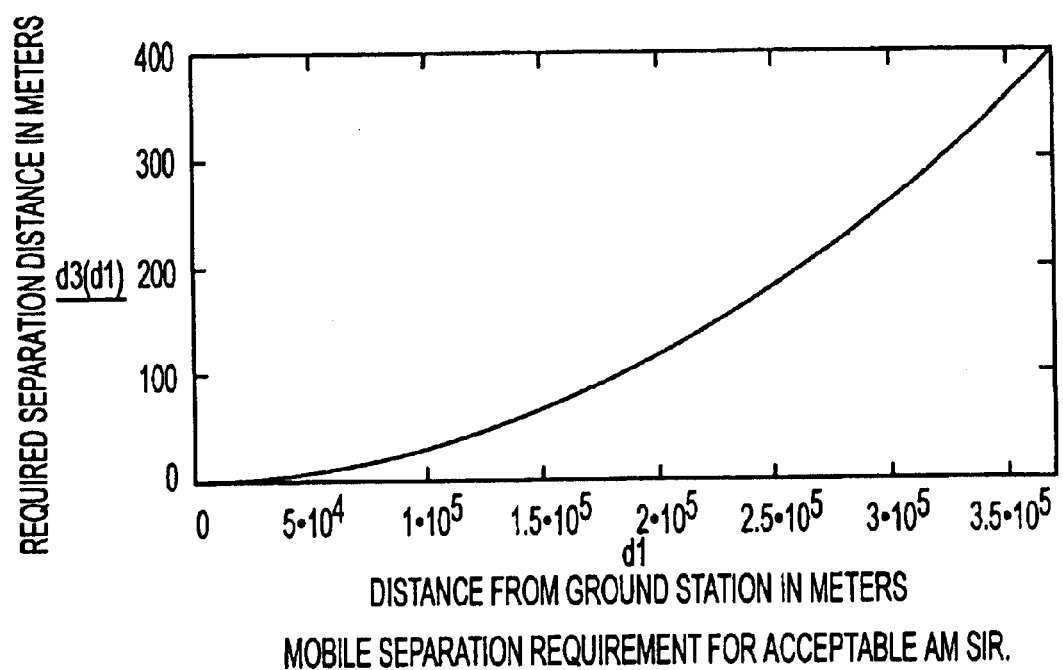
FIG. 4 shows the required separation distance between an analog mobile unit of the analog system of FIG. 1 and a digital mobile of the digital overlay system of FIG. 1 as a function of the distance to a digital ground station of the digital overlay system of FIG. 1.

The results based on these assumptions are shown in FIG. 4 and make it clear that the required separation distance d3 between the analog and digital mobiles 104 and 106 decreases as the distance d1 to the digital ground station 108 decreases.

These results are ideal in the case where the existing analog system 100 is the current commercial aviation communication systems. This is due to the fact that, at large distances from the analog and digital ground stations 105 and 108, aircraft carrying analog and digital mobile units 104 and 106 will already maintain the minimum separation distance d3 for aviation safety reasons. Moreover, hand-held digital mobile units can be used by ground personnel since the minimum separation distance is small when these digital mobile units and any analog mobile units are close to the digital ground station.

As just shown, the minimum separation distance d3 that must be maintained to prevent interference may already be required by safe operational considerations. The same minimum separation distance would therefore be required for any mobile units 104 and 106 in and out of the coverage area. Therefore, these mobile units will not add an appreciable amount of noise to the analog system 100.

Moreover, the digital system 102 may include additional ground stations that provide the same digital services as the ground station 108 but for a different coverage area. If this is the case, it can be assumed that the operational ranges of the digital ground stations will be such that their coverage areas will not overlap. As a result, the receive power from any digital ground station that is outside of the coverage area of the digital ground station 108 will be negligible due to attenuation by signal path loss.

From the foregoing, it is clear that a single interfering digital mobile unit 106 will not disrupt the quality of reception at a receiving analog mobile unit 104. But, referring back to FIG. 1, a probabilistic approach with simulations is required to show that multiple interfering digital mobile units 106 will not disrupt the reception at the receiving analog mobile unit. These simulations may be performed using MATLAB® software and by making the following assumptions:

there are 120 active digital mobile units distributed uniformly around the digital ground station 108

There is a 20 dBW output power limit on any digital mobile unit

The MAI (mutual access interference) noise can be modeled as uncorrelated

AWGN (additive white gaussian noise)

Maximal length DSSS codes are used

Figure 5:
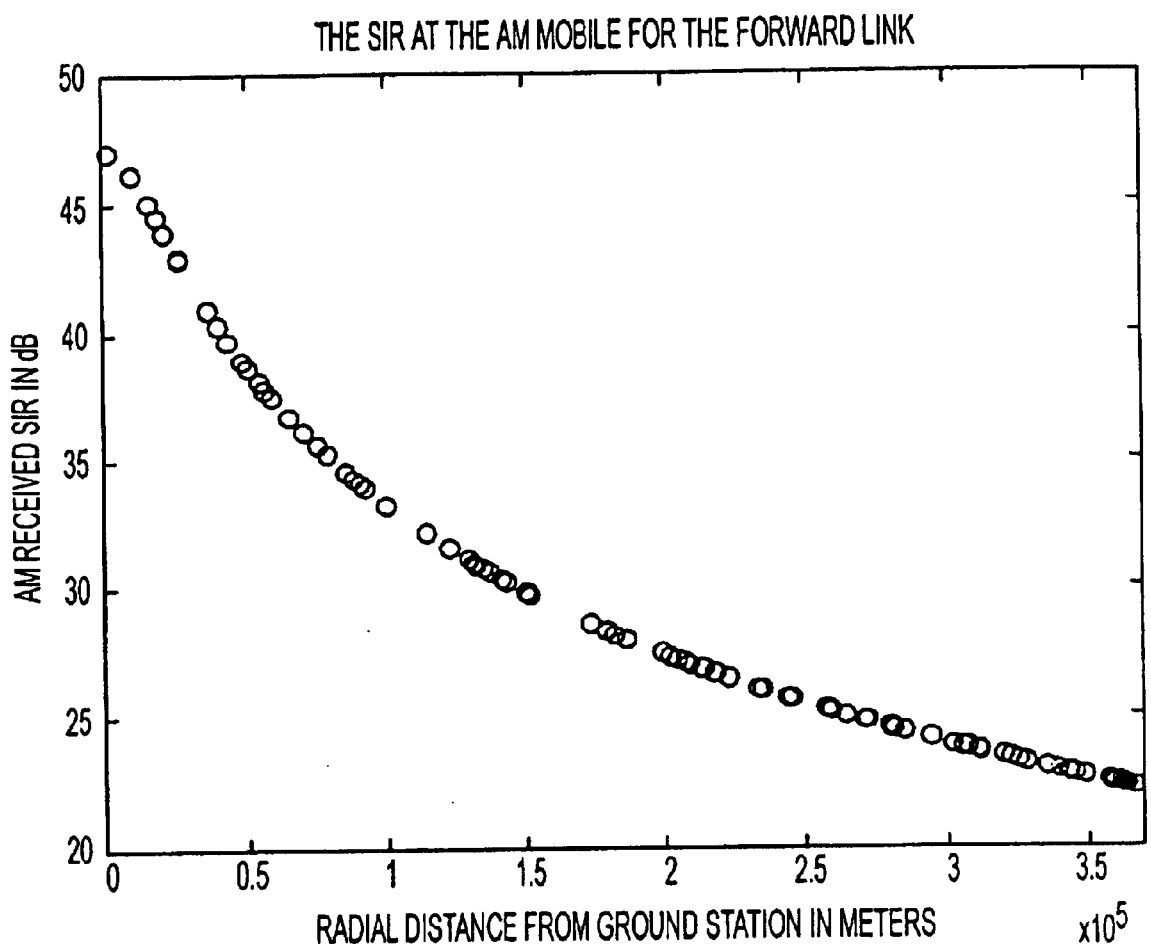
FIGS. 5 and 6 show plots of the SIR (signal to interference ratio) at a receiving analog mobile unit as a function of its radial distance from a digital ground station of the digital overlay system of FIG. 1 for forward and reverse links, respectively, in the digital overlay system.
Figure 6:
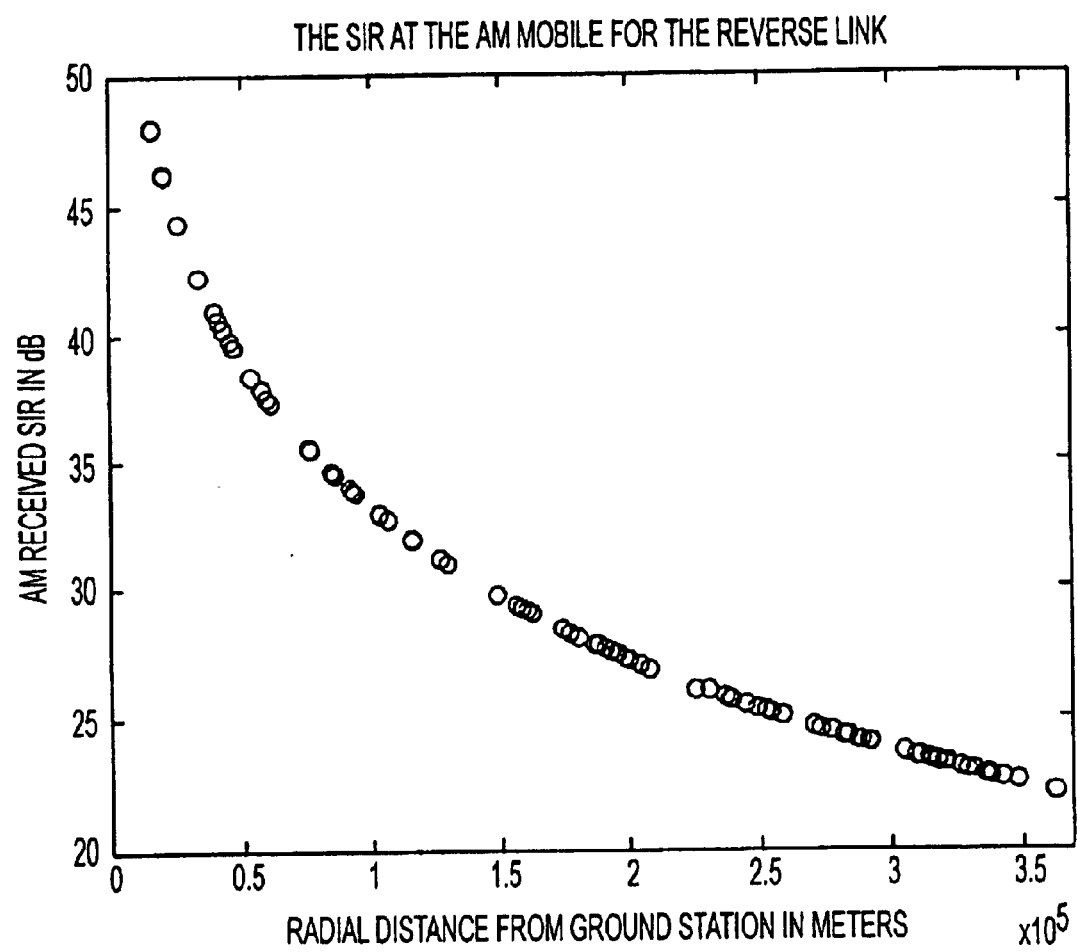

Plots of the SIR at the receiving analog mobile unit 104 as a function of its radial distance from the digital ground station 108 are given in FIGS. 5 and 6 for the forward and reverse links, respectively. In both cases, the SIR never drops below 23 dB which is an acceptable limit for the receiving analog mobile unit.

It must be mentioned here again that notch filtering is desirable, but not required in the DSSS overlay system 102. The performance of the DSSS overlay system is robust enough without it.

5.B.4. Near-Far Problem from Interfering Analog Mobile Units or Ground Station

Returning to FIG. 1, the near-far problem is also present in the DSSS overlay system 102 in the case of an interfering analog mobile unit 104 or ground station 105. The receiving digital mobile unit or ground station sees the analog signals transmitted by the interfering analog mobile unit or ground station as narrow band jamming signals.

The worst case is when an analog mobile unit 104 that is in close proximity to the receiving digital ground station interferes with the reception of DSSS signals at the digital ground station 108. For example, in the case where the existing analog system 100 is the current commercial aviation communication system, an analog mobile unit that is hand-held or on the ground nearby the digital ground station may interfere with the reception at the digital ground station.

Notch filtering is appropriate to allow proper reception of DSSS signals at a receiving digital mobile unit 106 or ground station 108. The notch filtering in this case suppresses the received DSSS signals in the frequency bands of the channels over which analog signals are currently detected. Like the notch filtering discussed section 5.B.3, the notch filtering here may be adaptive for the digital mobile unit 106 since the digital mobile unit changes location.

On the other hand, the notch filtering may be fixed for the digital ground station since it is in a fixed location, similar to the notch filtering discussed in section 5.B.2.

The notch filtering attenuation η required for the receiving digital mobile unit 106 or ground station 108 is obtained by using the expression:

$$SNR = (P_{TD} + G_P - L_{TD}) - (P_{TA} - L_{TA} - \eta) \quad (8)$$

Here, the following assumptions are used:
The signal path loss $L_A$=18 dB when the separation distance between the receiving digital mobile unit and the transmitting analog mobile unit is at least 5 ft
The signal path loss $L_D$=74 dB when the separation distance between the receiving digital mobile unit and the transmitting ground station is at most 3,000 ft
The power spectral density loss $G_P$=30 dB in the DSSS digital signals for a spreading gain ratio of 512:1
The maximum transmit power $P_{TA}$=20 dBW for the transmitting analog mobile unit
The acceptable SNR=7 dB at the receiving digital mobile unit 104

As a result, the adaptive notch filtering attenuation η required in this case is 33 dB. Again, this imposes only a modest notch filtering requirement on the receiving digital mobile unit or ground station.

It was just shown that a single interfering analog mobile unit 104 will not disrupt the quality of reception at a receiving digital mobile unit 106 or ground station 108. But, in any realistic implementation of the DSSS overlay system 102, there will be multiple interfering analog mobile units. Therefore, it must be shown that multiple interfering analog mobile units will not disrupt reception at the receiving digital mobile unit.

Figure 7:
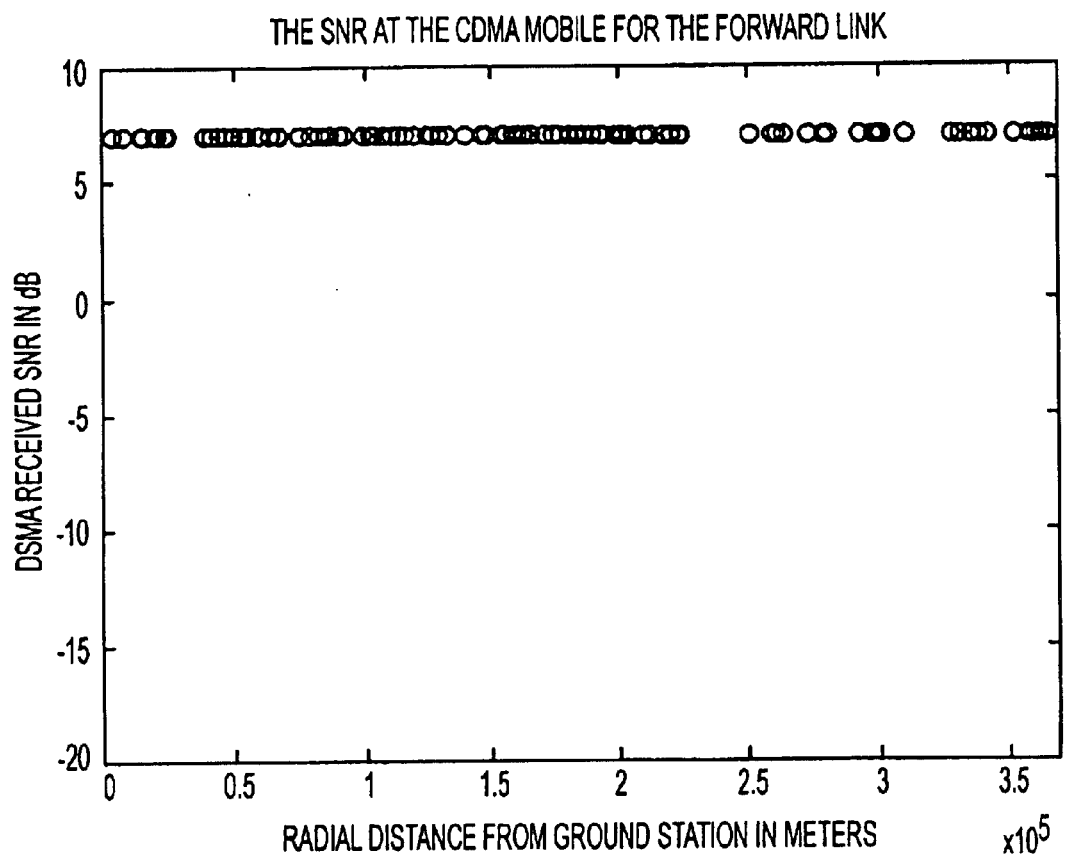
FIG. 7 shows the plot of the SNR (signal to noise ratio) at a receiving digital mobile unit of the digital overlay system of FIG. 1 as a function of its radial distance from a transmitting digital ground station of the digital overlay system.

As in the case of multiple interfering digital mobile units discussed in section 5.B.3, this requires a probabilistic approach with simulations. These simulations may also be performed with MATLAB® software. However, in this case, the following assumptions are made:
There are 100 active analog mobile units 104 distributed uniformly around the digital ground station 108
There is a 20 dBW output power limit on any analog mobile unit 104 and the digital ground station 108
The SNR desired at the receiving digital mobile unit is 7.0 dB
The MAI noise can be modeled as uncorrelated AWGN
The effect of adaptive notch filtering at the digital mobile unit can be modeled as a magnitude reducer of analog signals transmitted by the analog mobile units Maximal length DSSS codes are used For the forward link, the transmit power of the digital ground station 108 is then computed to achieve the desired SNR of 7.0 dB at the receiving digital mobile unit 106. A plot of the SNR at the receiving digital mobile unit as a function of its radial distance from the transmitting digital ground station is given in FIG. 7. It shows that the desired SNR can be achieved with limiting the power of the digital ground station to 20 dBW.

Figure 8:
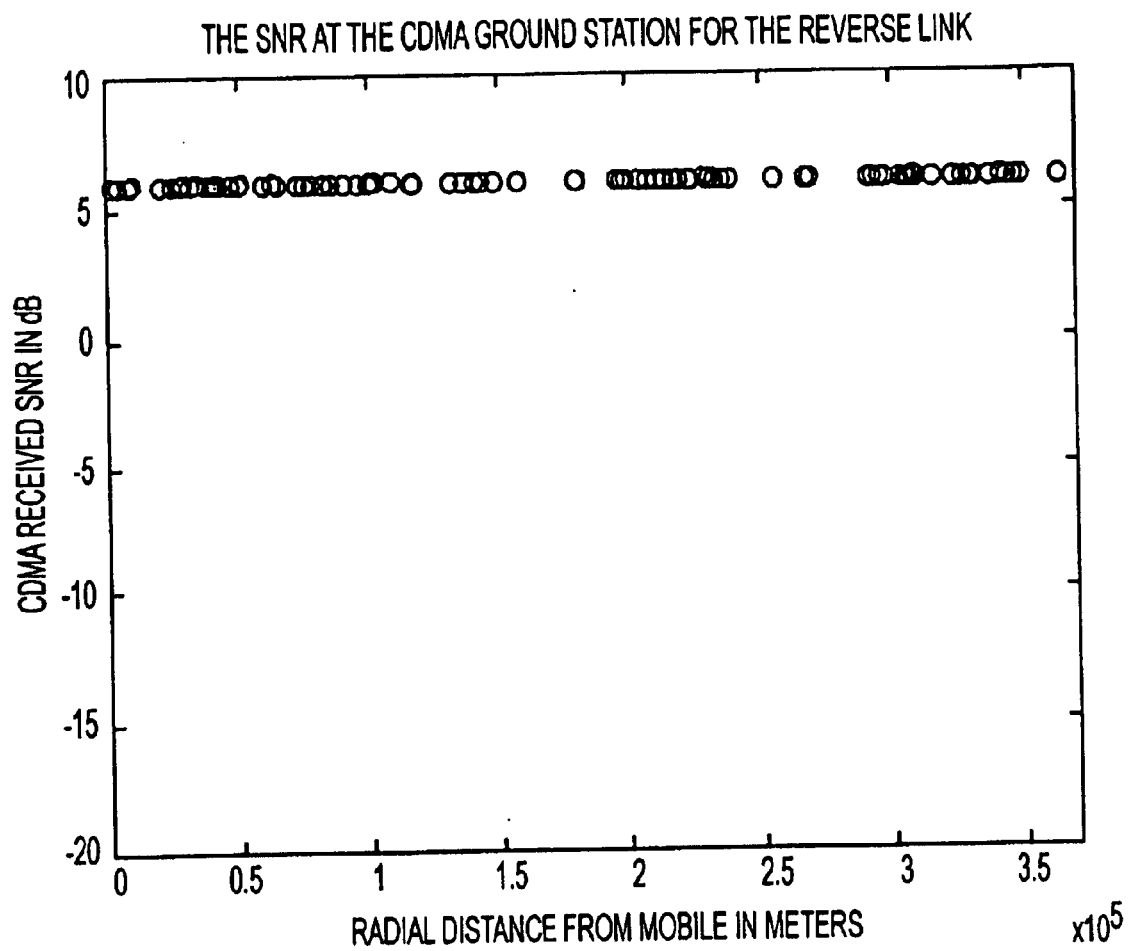
FIG. 8 shows the plot of the SNR (signal to noise ratio) at a receiving digital ground station of the digital overlay system of FIG. 1 as a function of its radial distance from a transmitting digital mobile unit of the digital overlay system.

Similarly, the required transmit power from a digital mobile unit 106 in the reverse link is computed to achieve an SNR of 6.0 dB at the receiving digital ground station 108. A plot of the SNR at the receiving digital ground station as a function of its radial distance from the transmitting digital mobile unit is given in FIG. 8. In this case, the desired SNR is not achieved at the largest distances from the digital ground station when the power of the digital mobile unit is limited to 20 dBW. This is due to the fact that the interfering analog mobile units 106 are centered about the digital ground station so that a greater noise floor is created than for any given digital mobile unit during the forward link. The lower SNR will not prevent digital data communication from taking place, but will reduce the effective data rate of DSSS data links established with digital mobile units located at these distances.

Once again it must be noted here that notch filtering is not required in the DSSS overlay system 102. The DSSS overlay system is robust enough without it.

5.B.5. SNR, BER, Transmit Power, Data Rate, and Capacity

The required SNR of the DSSS overlay system 102 is dependent on the BER (bit error rate) used. And, the BER is dependent on the modulation scheme used in spreading the DSSS signals and the type of FEC (forward error correction) coding used. FIG. 9 provides BER curves for BPSK (binary phase shift-keying) and QPSK (quadrature phase shift-keying) modulation schemes and various types of FEC codings for the forward DSSS data link.

Without taking the TDM scheme into account, the uncoded digital data contained in the DSSS signals is spread from a frequency bandwidth of 16 KHz to 16.384 MHz. More specifically, the uncoded data is spread from an uncoded data rate of 16 Kbps to a transmission data rate of 16.384 Mbps.

However, due to the propagation wait time required for proper TDM operation, the uncoded data rate is reduced by 6.3% as discussed in section 5.A. Therefore, the data rate is reduced to 14.992 Kbps (16 Kbps×93.7%).

To add robustness and reduce the required SNR, FEC encoding can be added. The selection of the type of FEC encoding to be used will depend on the specific requirements for the DSSS overlay system 102. For example, a DSSS system 102 installed in an area with high noise levels will require more FEC encoding and have a proportionally lower data rate. Site specific encoding rates can be accomplished by sending the FEC encoding scheme and data rates over a dedicated control channel of the DSSS overlay system.

The FEC coding results in a further reduction in the effective data rate. For example, in order to achieve an SNR of about 7 dB, a Reed Solomon (100, 94) Code should be used as shown in FIG. 9. In using the Reed Solomon (100, 94) Code, the actual uncoded data rate would be 14.092 Kbps (14.992 Kbps×94/100). With a post FEC encoding data rate of 32 Kbps and a transmission data rate of 16.384 Mbps, the spreading gain ratio is 512:1. However, the processing gain ratio is 16,384:14.092=1162.645:1.

As mentioned earlier in section 5.B.3, it is crucial in the digital overlay system 102 that the receive power of each reverse DSSS signal at the digital ground station 108 be very closely matched in magnitude. Otherwise, the digital ground station will be unable to receive DSSS signals that are lesser in magnitude. To ensure that proper power control is maintained, an open loop and a closed loop are employed for each digital mobile unit 106. The open loop is located in the digital mobile unit and estimates the required transmit power by measuring the received forward digital signal strength from the digital ground station. The closed loop is provided by the digital mobile unit and ground station together and is used to fine tune the transmit power estimated with the closed loop. More specifically, the digital ground station adds power control data to the digital signals to command the digital mobile unit to increase or decrease its transmit power to ensure that the reverse digital signal is within the required SNR at the digital ground station.

Unfortunately, the power control data destroys existing data in the digital signals. This is why the BER curves in FIG. 9 tend towards a horizontal asymptote instead of a vertical asymptote. Once the SNR becomes very high, the BER is due only to the power control data destroying some of the existing data.

In order to determine the required transmit power of the digital mobile units 106 as a function of the radial distance to the digital ground station 108, similar simulations to those described earlier in section 5.B.3 are used for the reverse DSSS data link. Here, the same assumptions are made, except that the SNR is 8.0 dB instead of 6.0 dB. FIG. 10 shows the results and clearly indicates that the digital mobile units can operate in a range of 370 km with a 20 dBW limit on the transmit power.

Similarly, the required transmit power of the digital ground station 108 as a function of the radial distance to the digital mobile units 106 can also be simulated using simulations like those described earlier in section 5.B.2 for the forward DSSS data link. FIG. 11 shows the results using the same assumptions, except that the SNR is 8.0 dB instead of 6.0 dB. For the most part, the required transmit power of the digital ground station is within the 20 dBW limit for the given range. But, the digital ground station does require considerably more power than expected for some of the digital mobile units. This is due to the interference received by these digital mobile units from a near by analog mobile unit 104.

The capacity of the DSSS overlay system 102 is limited in a number of ways. The spreading codes that are used may theoretically limit the number of DSSS channels that can be used at any one time epoch. For example, if maximal length spreading codes that are 512 bits long are used, then there is a maximum of 512 different channels that can be used at one time epoch. But, the capacity of the DSSS overlay system is really a function of the acceptable SNRs. Specifically, as mentioned earlier in section 5.B.2, the DSSS overlay system can support 120 digital mobile units 106. This means that 120 DSSS channels can be used at one time epoch. The total forward or reverse link data rate is therefore 1.691 Mbps (120×14.092 Kbps).

As in any communication system many trade-offs exist in the DSSS overlay system 102. These trade-offs enable the DSSS overlay system to be tailored for a specific environment. A brief description of these trade-offs is given next.

As just discussed, the transmit power used directly effects the range of the DSSS overlay system 102. The transmit power required can be varied on a unit-by-unit basis. This allows small hand-held digital mobile units 106 to operate with less than full transmit power, but with a reduced range. Similarly, if the transmit power of the digital ground station 108 is increased, the number of digital mobile units that operate in the DSSS overlay system can be increased. However, this will increase the background noise to the analog system 100.

The number of digital mobile units 106 in the DSSS overlay system 102 can be increased or decreased by making a corresponding change in the data rate. As discussed earlier in this section, the data rate depends on the SNR for a fixed BER. Thus, by decreasing the data rate, the SNR is lowered and the total number of digital mobile units can be increased. Similarly, the data rate can be increased in a similar manner by reducing the number of interfering analog mobile units 104.

Furthermore, there is a loss in capacity as the range of the DSSS overlay system 102 increases due to the propagation delay of the DSSS signals. Decreasing the range decreases this delay and correspondingly increases the data rate.

The BER rate increases or decreases in a response to an increase or decrease in the SNR. Similarly, for a given BER, the SNR can be increased or reduced by altering the type of FEC coding used. For example, increasing the amount of FEC coding results in a reduction of required SNR for a given BER. But, this is at the cost of reducing the data rate. Thus, BER, SNR and the data rate can be adjusted to provide optimal operation for a given application of the DSSS overlay system 102.

5.B.6. Digital Mobile Unit Configuration

An exemplary configuration of each digital mobile unit 106 in the DSSS implementation is shown in FIG. 12. Such a digital mobile unit includes a transceiver 110, a T/R (transmit/receive) antenna 111, N (i.e., one or multiple) data source(s)/sink(s) 112-1 to 112-N, where N≧1. The transceiver uses the T/R antenna to transmit and receive DSSS signals over N DSSS channels 1 to N established with other digital mobile units 106 and/or the ground station 108 of FIG. 1.

The transceiver 110 comprises a programmed microcomputer system 114, a receiver system 115, transmitter system 116, and a T/R switch 117. The T/R switch switches connection between the T/R antenna and the receiver electronics and the antenna and the transmitter electronics under the control of the microcomputer system. This is done in accordance with the TDM scheme discussed earlier in section 5.B and with control signals provided to the switch. In the case of each digital mobile unit 106 of FIG. 1, this means that DSSS signals detected by the T/R antenna are provided to the receiver system for reception during the forward link time slots and DSSS signals generated by the DSSS transmit electronics are provided to the T/R antenna for transmission during the reverse link time slots.

The digital data source/sinks 112-1 to 112-N may each be used for a corresponding type of digital data communication. For example, each digital data source/sink may be used for one of the types of digital data communication listed in Table 1. For each digital data source/sink 112-$n$, there is a corresponding DSSS channel n, where $1 \leq n \leq N$. The DSSS signals transmitted over this DSSS channel by the transceiver 110 contain digital data generated by the digital data source/sink. Similarly, the digital data contained by the DSSS signals received over this DSSS channel by the transceiver is provided to the digital data source/sink.

FIG. 13 shows an example of a digital data source/sink 112-$m$, where $1 \leq m \leq N$, used for voice communication. In the example where the analog system 100 is the current commercial aviation communication system, the digital data source/sink may comprise a voice communication console in an airplane. The digital data source/sink comprises a microphone 160, an audio preamplifier 161, a digital speech generator (e.g., an analog to digital converter or a vocoder) 162, and a PTT (push to talk) switch 163. When a user pushes the PTT switch and talks, the microphone converts any sound in the area, including the user's speech and any background noise, into analog data. The audio preamplifier amplifies the analog data and the digital speech generator converts the amplified analog data into digital data. The digital data is then provided to the microcomputer system 114 of FIG. 12.

Referring back to FIG. 12, as alluded to in section 5.B.5, the original digital data received by the microcomputer system 114 from each digital data source/sink 112-$n$ has an input data rate of 14.092 Kbps. This will achieve the desired SNR of 7 dB discussed in sections 5.B.3 to 5.B.5 at a receiving digital mobile unit 106 and/or ground station. The microcomputer system is programmed to process the original digital data by encrypting, FEC encoding, interleaving, and scrambling it. Encrypting the original digital data enables the transmitted DSSS signals containing the processed digital data to be securely transmitted to the receiving digital mobile unit 106 or digital ground station 108. The encryption is performed using well known techniques. FEC encoding is done to enable error detection and correction to be performed at the receiving digital mobile unit 106 or ground station 108. As mentioned earlier in section 5.B.6, for an input data rate of 14.092 Kbps and an SNR of 7 dB, the FEC code used may be a Reed Solomon (100, 94) Code. In this case, the output data rate of the processed digital data is 32 Kbps. The interleaving reduces burst errors in the processed digital data contained by the transmitted DSSS signals. The interleaving is also performed using well known techniques. The scrambling is done according to a predefined scrambling algorithm. This algorithm may be of the kind well known to those skilled in the art. The scrambling serves two purposes. First, it provides added security to the transmitted DSSS signals. Second, it prevents long sequences of ones or zeros in the processed digital data to be spread by the transmitter system 116 when generating the DSSS signals.

FIG. 14 shows one possible configuration for the transmitter system 116 in the digital mobile unit 106 of FIG. 12. It comprises an N channel spreading electronics block 118. The spreading electronics block is capable of spreading and modulating the processed digital data from the N digital data source(s)/sink(s) 112-1 to 112-N for transmission over the N corresponding DSSS channels 1 to N. In order to do so, it comprises N spreading electronics sub-blocks 119-1 to 119-N. For each DSSS channel n and corresponding digital data source/sink 112-$n$, there is a corresponding spreading electronics sub-block 119-$n$.

Turning back to FIG. 12, the transceiver 110 also comprises a frequency synthesizer 120. Under the control of the microcomputer system 114, the frequency synthesizer generates a local carrier waveform and an up-mix oscillator waveform. This is done with control signals provided to the frequency synthesizer to provide proper timing. The local carrier and up-mix oscillator waveforms are used by the spreading electronics blocks 119-1 to 119-N of FIG. 14 for up-mix frequency translation and data modulation, respectively, as will be discussed shortly.

The transceiver 110 further comprises a DSSS spreading code generator 121. As mentioned earlier in section 5.B.2, the digital overlay system 102 has the capacity for 120 DSSS channels to be used at one time epoch. Thus, the DSSS spreading code generator stores a corresponding DSSS spreading code for each of these DSSS channels. For each DSSS channel n that is currently being used by the transceiver, the DSSS spreading code generator generates a DSSS spreading code waveform from the corresponding DSSS spreading code. This is done under the control of the microcomputer system 114 with control signals provided to the DSSS spreading code generator to select the DSSS spreading code used to generate the DSSS spreading code waveform and to provide proper timing. Each DSSS spreading code waveform is provided to the corresponding spreading electronics block 119-$n$ to spread the DSSS signals generated by these electronics for transmission over the corresponding DSSS channel. The selected DSSS channel (and therefore the corresponding DSSS code) may be assigned in the manner discussed earlier in section 5.A.

Returning to FIG. 14, each spreading electronics block 119-$n$ comprises a corresponding DQAM (Digital Quadrature Amplitude Modulation) modulator 122-$n$. From the microcomputer system 114, the DQAM modulator receives the processed digital data of the corresponding digital data source/sink 112-$n$. The DQAM modulator modulates the local carrier waveform received from the frequency synthesizer 120 of FIG. 12 with this processed digital data to produce pre-spread digital data signals (hereafter "pre-spread signals"). The local carrier waveform's frequency is an intermediate frequency used by the transceiver 110. As a result, the center frequency of the pre-spread signals is also the intermediate frequency. As those skilled in the art will recognize, other modulators using other types of data modulation could be used for this purpose.

Each spreading electronics block 119-$n$ also comprises a corresponding DSSS modulator 123-$n$. The DSSS modulator receives the pre-spread signals and modulates (i.e., spreads) them with the DSSS spreading code waveform for the corresponding DSSS channel n to generate original DSSS signals. The DSSS spreading code waveform is received from the DSSS spreading code generator of FIG. 12. As discussed in section 5.B.1, the DSSS spreading code for the DSSS spreading code waveform may be 512 bits long. Therefore, with the input data rate of 32 Kbps, the output data rate of the local DSSS signals is 16.384 Mbps. This, provides a spreading gain ratio of 512:1 and a processing gain ratio of 16,384:14.092. The original DSSS signals are spread over the desired spreading bandwidth of 16.384 MHz around the original DSSS signals' center frequency. As with the pre-spread signals, this center frequency is the intermediate frequency of the transceiver 110.

As discussed in section 5.B.5, DSSS signals received from a digital ground station 108 of FIG. 1 will include power control data to indicate whether the transmit power of DSSS signals transmitted by the digital mobile unit 106 of FIG. 1 should be changed so that the desired SNR of 7 db at the digital ground station is maintained. Thus, each spreading electronics block 119-$n$ additionally comprises a corresponding power control attenuator 124-$n$ that receives the original DSSS signals from the corresponding DSSS modulator 123-$n$. If the corresponding DSSS channel n is being used to transmit DSSS signals to a digital ground station, the microcomputer system 114 extracts the power control data from the received DSSS signals in the manner discussed shortly. The microcomputer system controls the attenuator in attenuating the original DSSS signals according to the extracted power control data. This is done with control signals provided to the attenuator. On the other hand, if the DSSS channel n is being used to transmit DSSS signals to another digital mobile unit 106 of FIG. 1, then the microcomputer system does not control the attenuator to attenuate the original DSSS signals.

In this way, the transmit power used over each DSSS channel n can be individually controlled. Thus, the DSSS signals can be transmitted by a digital mobile unit 106 of FIG. 1 to the digital ground station 108 and other mobile units 106 of FIG. 1 at different transmit powers. If there are multiple digital ground stations servicing the coverage area, this would also be true for DSSS signals transmitted to those digital ground stations.

The transmitter system 116 also comprises a transmitting electronics block 125 to prepare the attenuated and/or unattenuated DSSS signals from the spreading electronics subblocks 119-1 to 19-N for transmission. As discussed next, this is done by combining, up-mixing, notch filtering, and amplifying the DSSS signals.

The transmitting electronics block 125 comprises a combiner 126. The combiner combines together all of the attenuated and/or unattenuated DSSS signals from the spreading electronics blocks 119-1 to 119-N.

The transmitting electronics block 125 further comprises an up-mixer 127. This up-mixer mixes the combined DSSS signals with the up-mix oscillator waveform received from the frequency synthesizer 120 of FIG. 13. This translates the center frequency of the combined DSSS signals up from their intermediate frequency to the desired center frequency of the DSSS overlay system 102. As mentioned in section 5, this center frequency may be at 128 MHz of the VHF band for the implementation covering the existing commercial aviation communication system.

The up-mixed DSSS signals are then provided to an adaptive notch filter 128 of the transmitting electronics block 125. In the manner discussed in section 5.B.3, the notch filter is used to notch any portions of the frequency spectrum of the combined DSSS signals which may interfere with reception of analog signals by the analog mobile units 104 and/or ground stations 105. Adaptive notch filtering is used since the frequencies of analog signals change as a function of the location of the digital mobile unit 106 and therefore may not be known. The adaptive notch filtering is performed according to well known adaptive notch filtering techniques.

In this configuration of the transmitter system 116, the adaptive notch filter 128 uses filter coefficients from another adaptive notch filter 130 in the receiver system 115 of FIG. 15 to notch the frequency spectrum of the combined DSSS signals. As discussed shortly, this other notch filter monitors the frequency spectrum of signals received by the receiver system to identify the portions of the frequency spectrum in which there are analog signals being transmitted by nearby analog mobile units 104 and/or ground stations 105. It then computes the appropriate filter coefficients.

The transmitting electronics block 125 also comprise a power amplifier 129. The power amplifier then amplifies the notched DSSS signals for transmission by the T/R antenna 111 via the T/R switch DQAM.

Turning again to FIG. 12, as mentioned earlier, the transmit/receive switch 117 switches connections in accordance with the TDM scheme discussed earlier in section 5.B. Thus, the amplified DSSS signals are provided to the T/R antenna 111 and transmitted over their respective DSSS channels 1 to N during the reverse link time slots of the TDM scheme.

The signals received by the T/R antenna 11 and provided to the receiver system 115 by the T/R switch 117 contain DSSS signals from other digital mobile units 106 and/or the digital ground station 108 of FIG. 1. These signals also may contain interfering analog signals from the analog mobile units 104 and/or the analog ground station 105 of FIG. 1.

FIG. 15 shows one possible configuration for the receiver system 115. It comprises a receiving electronics block 130 to prepare the DSSS signals detected by the T/R antenna 111 for despreading and demodulation. This is done by filtering, amplifying, notch filtering, and down-mixing all of the signals, including the DSSS signals, detected by the antenna.

The receiving electronics block 130 comprises a preselector filter 131 and an LNA (low noise amplifier) 132. The signals provided to the receiver system are first bandpass filtered by the preselector filter to only pass signals in the frequency band of the existing analog system 100. Then, the filtered signals are amplified by the LNA.

The adaptive notch filter 133 in the receiving electronics block 130 is then used to remove any interfering analog signals from among the amplified signals provided by the LNA 132 in the manner discussed in section 5.B.4. As mentioned earlier in this section, this notch filter monitors the frequency spectrum of the amplified signals to identify any portions in which there are interfering analog signals from nearby analog mobile units 104 and/or ground stations 105. It then computes the appropriate filter coefficients and notches the frequency spectrum of the amplified signals in the identified portions using these filter coefficients. This is done under the control of the microcomputer system 114 with control signals provided to the adaptive notch filter 133 in a similar manner to that discussed earlier for the adaptive notch filter 128 in the transmitter system 116 of FIG. 14. As a result, DSSS signals notched in these identified portions are output by the adaptive notch filter 133.

The receiving electronics block 130 also includes a downmixer 134 that receives the notched DSSS signals from the adaptive notch filter 133. The down-mixer translates the center frequency of the carrier waveforms of the notched DSSS signals down from their transmit frequency to the intermediate frequency used by the transceiver 110. This is done in response to a down-mix oscillator waveform from the frequency synthesizer 120 of FIG. 12.

The down-mixed DSSS signals are then provided to the N channel despreading electronics block 135 of the receiver system 116. The despreading electronics block is capable of despreading and demodulating N down-mixed DSSS signals received over N corresponding DSSS channels 1 to N. For doing so, it comprises N despreading electronics sub-blocks 136-1 to 136-N with a corresponding despreading electronics sub-block 136-*n* for each DSSS channel n.

Each despreading electronics sub-block 136-*n* comprises a corresponding DSSS despreading correlator 137-*n*. The despreading correlator receives the down-mixed DSSS signals and extracts and despreads those that were originally spread and transmitted over the corresponding DSSS channel n by a transmitting digital mobile unit 106 and/or ground station 108 of FIG. 1. This is done with the DSSS spreading code waveform for the DSSS channel. The DSSS spreading code generator of FIG. 12 provides the DSSS spreading code waveform and adjusts its phase under the control of the microcomputer system 114 to track the DSSS signals transmitted over the DSSS channel. This is done with control signals provided by the microcomputer system to the DSSS spreading code generator in response to control signals received from the despreading correlator.

An IF (intermediate frequency) filter 138-*n* in each despreading electronics sub-block 136-*n* bandpass filters the despread signals around the intermediate frequency. This removes any noise from the despread signals.

Each despreading electronics sub-block 136-*n* also comprises a corresponding DQAM demodulator 139-*n*. The demodulator demodulates the filtered signals to extract the processed digital data contained by them. This is done with a local oscillator waveform from the frequency synthesizer 120 of FIG. 12. The frequency synthesizer provides the local oscillator waveform and adjusts its phase under the control of the microcomputer system 114 to track the DSSS signals transmitted over the corresponding DSSS channel n. This is done with control signals provided to the frequency synthesizer and in response to control signals received from the DQAM demodulator.

Returning to FIG. 12, the microcomputer system 114 then processes the extracted digital data from each despreading electronics sub-block 136-n of FIG. 14 to obtain the original digital data generated by the transmitting digital mobile unit 106 or ground station 108. This is done by descrambling, deinterleaving, performing FEC error detection and correction on, and decrypting the extracted digital data. The resulting original data is then provided to the corresponding digital data source/sink 112-n by the microcomputer system.

In the example in FIG. 13 of a digital data source/sink 112-m for voice communication, the digital data source/sink also comprises a digital speech converter (e.g., a digital to analog converter and/or a codec) 164, an audio amplifier 165, and a loudspeaker 166. The digital speech converter converts the digital data provided by the microcomputer system 114 into analog data. The audio amplifier amplifies the analog data and the loudspeaker converts the amplified analog data into sound.

As those skilled in the art will recognize, there are numerous alternative configurations for each digital mobile unit 106 of FIGS. 12 to 15. For example, the adaptive notch filter 128 of the transmitter system 116 of FIG. 14 could be placed before the up-mixer 127. Similarly, the adaptive notch filter 133 of the receiver system 115 of FIG. 15 could be placed after the down-mixer 134. In this case, the adaptive notch filtering would take place around the intermediate frequency.

In another alternative configuration, up-mix frequency translation in the transmitter system 116 of FIG. 14 could occur before spreading. In this case, each spreading electronics block 119-n would include an up-mix frequency translation before the DSSS modulator 123-n. Similarly, down-mix frequency translation in the receiver system 115 of FIG. 15 could occur after despreading. Each despreading electronics sub-block 136-n would therefore include a down-mixer before the DSSS despreading correlator 137-n.

In still another alternative configuration, up-mix frequency translation in the transmitter system 116 of FIG. 14 could occur after spreading in each spreading electronics block 119-n. In this configuration, an up-mixer would be located after the DSSS modulator 123-n or the power control attenuator 124-n.

In yet another alternative configuration, no adaptive notch filters would be included in the transmitter and receiver electronics 115 and 116 of FIGS. 14 and 15. As indicated in sections 5.B.2 to 5.B.4, the DSSS overlay system 102 is robust without notch filtering. But, ultimate performance may be achieved with notch filtering.

5.B.7. Digital Ground Station Configuration

FIG. 12 also shows an exemplary configuration of each digital ground station 108 in the DSSS implementation. It is configured and operates in a similar manner to that described earlier in section 5.B.6 for each digital mobile unit 106. Thus, only the major differences will be discussed hereafter.

Similar to the switching operation discussed in section 5.B.7, the microcomputer system 114 here controls the T/R switch 117 in switching connection in accordance with the TDM scheme discussed earlier in section 5.B. Here, however, DSSS signals detected by the T/R antenna 111 are provided to the receiver system 115 for reception during reverse link time slots and DSSS signals generated by the transmitter system 116 are provided to the T/R antenna for transmission in forward link time slots.

The microcomputer system 114 is programmed to process the original digital data from each digital data source/sink 112-n in a similar manner to that discussed in section 5.B.6. However, there is one notable difference. In this case, the processing includes attaching power control data if the original data is being transmitted to a digital mobile unit 106 of FIG. 1. As just discussed in section 5.B.6, the power control data indicates whether the transmit power of DSSS signals transmitted over the corresponding DSSS channel n by a digital mobile unit 106 of FIG. 1 should be changed so that the desired SNR of 7 db at the digital ground station is maintained. The power control data is generated by the microcomputer system based on the signal strength of the DSSS signals received from the digital mobile unit. This signal strength is determined from control signals provided to the microcomputer system by the DSSS despreading correlator 137-n of the corresponding despreading electronics block 136-n of FIG. 14.

In the digital ground station 108, many of the digital data sources/sinks 112-1 to 112-N may be used for voice communication. For example, where the analog data communication system 100 is the current commercial aviation communication system, these digital data sources/sinks may comprise voice communication consoles in the control tower of an airport. Each of these digital data sources/sinks may be configured like the digital data source/sink 112-m in FIG. 13.

FIG. 16 shows one possible configuration for the transmitter system 116 in the digital ground station 108 of FIG. 12. It is configured and operate in a similar manner as that discussed in section 5.B.6, except for a few differences which are noted next.

First, the spreading electronics sub-blocks 119-1 to 119-N do not include the power control attenuators of FIG. 13. This is due to the fact that the digital ground station 108 always transmits the DSSS signals it generates at the same power while, as just discussed, the transmit power of DSSS signals transmitted by digital mobile units 106 is controlled at the digital mobile units.

Second, the transmitter electronics block 125 comprises a fixed notch filter 140 instead of the adaptive notch filter 128 of FIG. 13. The fixed notch filter always notches the same portions of the frequency spectrum of the up-mixed DSSS signals from the up-mixer 127. This is due to the fact that these portions are occupied by analog signals from nearby analog digital mobile units 104 and/or ground stations 105 and are known and fixed. Thus, the appropriate coefficients used by the fixed notch filter are easily selected and remain constant. The fixed notch filter otherwise operates and is controlled in the same manner as described earlier for the adaptive notch filter 128.

FIG. 17 shows one possible configuration for the receiver system 1115 in each digital ground station. It is configured and operated in a similar manner as the receiver system 115 of FIG. 14 discussed in section 5.B.6, except for one difference. In this case, each despreading electronics sub-block 136-n comprises a fixed notch filter 141 instead of the adaptive notch filter 133 of FIG. 15. The fixed notch filter is used for the same reason as that just discussed for the fixed notch filter 140.

There are also numerous alternative configurations for each digital ground station 108. As those skilled in the art will recognize, these alternative configurations would include similar ones to those discussed earlier in section 5.B.6 for each digital mobile unit 106.

5.C. FHSS Implementation

Referring again to FIG. 1, in the FHSS implementation of the digital overlay system 102 (hereafter "FHSS overlay system 102"), digital data communication also takes place at the same time and in the same frequency band as analog data communication in the existing analog system 100. Here, the digital data communication signals (hereafter "FHSS signals") are transmitted by using FHSS codes to hop between locally unused hop frequency bands. Each FHSS code identifies the hop frequency bands for a corresponding digital data communication channel (hereafter "FHSS channel"). The selection of the FHSS codes is discussed in section 5.C.1.

Similar to the DSSS implementation, there are several other important features that are used to enable the analog system and the FHSS overlay system to coexist. These features are identified in sections 5.C.2. and 5.C.3 by addressing the near-far problem and their relationship with each other is further discussed in section 5.C.4. The configuration of each digital mobile unit 106 and ground station 108 is then discussed in sections 5.C.5. and 5.C.6.

5.C.1. FHSS Codes Hop Rate, and Hop Bandwidth

If truly orthogonal FHSS spreading codes are used, no hop frequency band is ever used by more than one digital mobile unit 106 at a time epoch. But, if the FHSS spreading codes are not truly orthogonal and have a small amount of cross-correlation, more than one digital mobile unit will use the same hop frequency band at the same time epoch. This may result in a potential loss of data. Therefore, the number of mobile units operating at the same time epoch is limited by the number of orthogonal FHSS spreading codes.

The example of FIG. 18 shows the case where 5 hop frequency bands $F_1$ to $F_5$ are used with 5 digital mobile units 106. Each digital mobile unit is assigned a corresponding frequency hop code $C_y$, where y=1 to 5 and designates the digital mobile unit. At each hop time epoch $T_x$, where x=1 to 5, each digital mobile unit transmits at a different hop frequency band. The channels centered at these bands do not need to be contiguous, or even sequential. They only need to be non-overlapping. As those skilled in the art will recognize, this concept extends to any combination of M hop frequency bands and N digital mobile units, where M≧N.

The hop rate is dependent on two major factors, namely cost of implementation and required jamming rejection. Using a fast hop rate that is more than one hop per data bit, makes repeat-follower jamming very difficult and increases the security of the FHSS overlay system 102. However this security requires greater complexity, thereby increasing the cost of a digital mobile unit 106. A penalty is also incurred as the number of hops per bit increases. Specifically, the recombination of data occurs non-coherently, which results in an equivalent loss in SNR.

If a slower hop rate is used, interleaving is needed to combat burst errors. In the rare occurrence of an FHSS hop onto the frequency band of an analog channel that is being used, a slow hop rate will be more noticeable to an analog mobile unit 104 communicating over that channel. A hop rate of 500 hops per second is a good compromise between cost and security.

In the example where the analog data communication system 100 is the current commercial aviation communication system, the FHSS overlay system 102 may be operable over a bandwidth of 16 MHz in the VHF band. Assuming a desired transmission bandwidth of 150 KHz for each hop frequency band, about 106 of these frequency bands will fit into the entire 16 MHz bandwidth.

5.C.2. Near-Far Problem in Analog System With Interfering Digital Mobile Unit or Ground Station As alluded to earlier, the basic tenet in the FHSS implementation is to avoid transmitting the FHSS signals over any analog channels (i.e., frequency bands) where analog data communication is taking place. To do this, a transmitting digital mobile unit 106 or ground station 108 must determine before each hop is made whether the corresponding hop frequency band is being locally used for analog data communication. Because of the nature of analog data communication, the duration of transmissions of analog communication signals are much longer than those of the FHSS signals. Therefore, the transmitting digital mobile unit 106 or ground station 108 only needs to monitor the hop frequency band over a few consecutive samples before transmitting in the band. If an analog signal is detected over all of the samples, then transmission of a packet of the FHSS signal in that particular band is suppressed.

However, there is the possibility that detection of an analog signal will be missed. To find the probability of missed detection, it can be assumed that the noise energy detected in the hop frequency band can be modeled as AWGN. Thus, the decision threshold can be set so that the probability of missed detection $P_{miss}$ is equal to the probability of false alarm. If the energy of a transmitted analog signal is $E_{AN}$, then the probability of missed detection is:

$$P_{miss} = \frac{1}{\sqrt{2\pi}\,\sigma} \int_{-\infty}^{\lambda} e^{-\frac{(x-\sqrt{E_{AN}})^2}{2\sigma^2}} dx \qquad (9)$$

where $\sigma^2$ is the variance of the AWGN and $\lambda$ is a detection threshold. For equal probability of miss detection and false alarm, where $$\lambda = \frac{1}{2}\sqrt{E_{AN}},$$

EQ. 9 can be re-written as the Q function:

$$P_{miss} = Q\left[\sqrt{\frac{P_{AN}\Delta t/Y}{2N_0}}\right] \qquad (10)$$

where $N_0=4.0\times10^{-21}$ and is the double sided noise power spectral density, $\sigma^2=N_0/2$, $P_{AN}$ is the transmit power, $\Delta t$ is the detection period, $Y=15.2539\times10^{12}$ and is the reduction in power that the analog signal undergoes when transmitted from a distant analog mobile unit 104 or analog ground station 105, and $E_{AN}=P_{AN}\Delta t/Y$.

Assuming the transmit power $P_{AN}$=20 Watts, the detection period $\Delta t$ is 2 ms at a distance of twice the range of 740 km from the transmitting analog mobile unit 104 or analog ground station 105, the argument of the Q-function in Eq. 10 is 572. The equivalent probability of missed detection $P_{miss}$ is less than $10^{-10}$. This is small enough to be neglected.

Therefore, the only possible interference from the FHSS overlay system 102 is due to simultaneous transmission and propagation delay of digital and analog signals. The effect will at most be a very short popping sound at a receiving analog mobile unit 104 or analog ground station 105.

5.C.3. Near-Far Problem in FHSS Overlay System With Interfering Analog Mobile Unit or Ground Station The near-far problem must also be addressed in the FHSS overlay system 102 for an interfering analog mobile unit 104 or ground station 105. The only interference to a receiving digital mobile unit 106 or ground station 108 is when a data packet of an FHSS signal is lost or suppressed.

As mentioned earlier, a data packet that is to be transmitted in a hop frequency band is suppressed when an analog signal is detected in that band. However, a data packet may be lost if there is a missed detection as described in section 5.C.2. or an interfering analog mobile unit 104 or ground station 105 begins transmitting an analog signal in the band after the transmitting digital mobile unit 106 or ground station 108 has started transmitting the data packet. In either case, the data packet collides with the analog signal and, in most cases, is lost.

Because an FHSS signal is transmitted over many hop frequency bands, a collision between the FHSS signal and an analog signal happens infrequently. The loss of a data packet from a collision is over come by using FEC coding and interleaving to allow the receiving digital mobile unit 106 or ground station 108 to reconstruct the lost data in the data packet.

It is important to note here that, as the number of analog channels in the existing analog system 100 is increased, the amount of lost data packets also increases. Once the collisions destroy more data than the FEC can correct, the FHSS overlay system 102 reaches its operational limit. Thus, the number of analog channels being used affects the ability of the FHSS overlay system to operate.

5.C.4. SNR, BER, Data Rate, Transmit Power, and Capacity

Given a desired SNR for the system, the BER depends on the modulation scheme and coding used. For ease of implementation and reduced cost, the FHSS overlay system 102 may use standard non-coherent BFSK (binary frequency-shift keying) or MFSK (m'ary frequency-shift keying) modulation. Although this requires a higher SNR than other modulation types for the same BER, it does not require phase synchronization. This reduces the complexity and cost of the digital mobile units 106. As those skilled in the art will recognize, other modulations schemes, such as BPSK, QPSK, etc., could also be used.

BER curves for the BFSK modulation are given in FIG. 19. Unlike the BER curves in FIG. 9, the curves in FIG. 19 have a shelf or asymptote at which increasing the SNR has no appreciable decrease in BER. This shelf exists in the FHSS implementation because of the near-far problem. Specifically, after the SNR reaches a level where the bit errors are due solely to collisions between the analog signals and the FHSS signals, using additional power to transmit these FHSS signals will not overcome the collisions. Thus, the nearby interfering analog mobile unit 104 or ground station 105 has much more influence on the SNR of the receiving digital mobile unit 106 or ground station 108 than the transmitting digital mobile unit or ground station.

Assuming non-coherent MFSK modulation, the uncoded data rate R for the forward or reverse link is given by:

$$R = \frac{W_{HOP} \log_2 M}{M} \quad (11)$$

where $W_{HOP}$ is the transmission data rate in each hop frequency band and M is the number of FSK levels. In the TDM scheme, a forward or reverse link is only used 50% of the time. Thus, the effective transmission data rate $W_{HOP}$ drops from 150 Kbps to 75 Kbps when each hop frequency band has a 150 KHz bandwidth. For either M=2 or M=4 and an effective data rate $W_{HOP}$=75 Kbps, the data rate R is 37.5 kbps.

Taking into consideration the 6.3% loss of bandwidth due to the propagation delay time, which was discussed in section 5.A, the new data rate is 35.137 Kbps (37.5 Kbps×0.937). Furthermore, as shown in FIG. 19, a Reed Solomon (150, 96) code is needed to keep the required SNR near 12.0 dB. This results in a data rate of 22.488 Kbps (35.137 Kbps×96/150). If more FEC coding is required, the data rate can be reduced accordingly to incorporate the additional FEC coding bits.

Because the range dictates the practical range of the system, the transmit power requirement is based on how much power is needed to allow communication at the range given a specific modulation scheme. For example, to achieve an SNR of 12.0 dB, the digital mobile units 106 and ground station 108 each require 8 dBW of continuous output power to communicate at the range. For digital mobile units operating near the ground station, much less than 5 dBW of power is required. Moreover, in the case of small hand-held digital mobile units, battery capacity is the limiting factor on output power and, consequently, the effective communication range. Although there is no need for power control in the FHSS implementation, power control can be implemented in order to increase the operational time for such digital mobile units.

As described earlier, the spread spectrum bandwidth $W_{SS}$ of the digital overlay system 102 is 16 MHz and each hop frequency band has a bandwidth of 150 KHz. Therefore, the upper bound on the capacity of the FHSS overlay system is 106 (16 MHz/150 KHz) FHSS channels. This means that 106 digital mobile units 106 can be used in the FHSS overlay system at one time epoch.

Moreover, the total forward or reverse link data rate in the FHSS overlay system is 2.384 Mbps (106 data links×22.488 kbps). This data rate is approximately 30% higher than that for the DSSS overlay system discussed in sections 5.B to 5.B.7. The reason for the difference is that the narrowband analog signals are more effective in jamming the DSSS overlay system.

As with the DSSS overlay system discussed in sections 5.B to 5.B.7, many trade-offs exist in the FHSS overlay system 102. These trade-offs includes those already discussed in section 5.B.5. for the DSSS overlay system. Furthermore, for a fixed spread spectrum bandwidth, the number of available hop frequency bands is dictated by the data rate. In order to avoid collisions between digital mobile units 106, only one hop frequency band should be allocated per mobile unit at any hop time epoch. Therefore, the number of digital mobile units is dictated by the number of hop frequency bands. Reducing the data rate increases the number of hop frequency bands and thereby increases the number of digital mobile units that can be used.

5.C.5. Digital Mobile Unit Configuration

FIG. 20 shows an exemplary configuration of each digital mobile unit 106 in the FHSS overlay system 102. It is configured and operates in a similar manner to that described earlier in section 5.B.6 and shown in FIG. 12, except for some notable differences that are discussed next.

The transceiver 110 in this case includes an FHSS spreading code generator 142 rather than the DSSS spreading code generator 121 of FIG. 12. Under the control of the microcomputer system 114, the FHSS spreading code generator provides the FHSS spreading codes selected for the FHSS channels 1 to N to the frequency synthesizer 120. In response, the frequency synthesizer generates corresponding up-mix oscillator waveforms provided to the transmitter system 116 and down-mix oscillator waveforms to the receiver system 115.

FIG. 21 shows one possible configuration for the transmitter system 116 in each digital ground station 108 for the FHSS implementation. It is configured and operates in a similar manner to the one shown in FIG. 14 and discussed in section 5.B.6, except for the differences discussed hereafter.

Each spreading electronics sub-block 119-n comprises an up-mixer 143-n rather than the DSSS modulator 123-n of FIG. 14. The up-mixer receives a corresponding up-mix oscillator waveform from the frequency synthesizer 120. As alluded to earlier, this up-mix oscillator waveform is generated in response to the FHSS spreading code selected for the corresponding FHSS channel n and received from the FHSS spreading code generator 121. The up-mix oscillator waveform has a frequency that varies according to the FHSS spreading code. As a result, the up-mixer mixes the modulated signal from the DQAM modulator 122-n with the up-mix oscillator waveform to generate up-mixed FHSS signals that hop across the hop frequency bands identified by the FHSS spreading code.

Since up-mixing occurs in each spreading electronics sub-block II 9-n, the transmitting electronics block 125 does not comprise the up-mixer 127 of FIG. 14. Moreover, since the transmitted FHSS signals are hopped across locally unused frequency bands, there is no need for the adaptive notch filter 128 of FIG. 14 in the transmitting electronics block.

But, the transmitting electronics block 125 does comprise a transmission suppressor 144 to suppress the combined FHSS signals from the combiner 126 in the frequency bands that are currently being used to transmit analog signals. In doing so, the transmission suppressor receives the signals detected by the T/R antenna 111 of FIG. 19 via the T/R switch 117 of FIG. 19. The transmission suppressor analysis the frequency spectrum of these signals and identifies the frequency bands in which analog signals are currently being transmitted. If the combined FHSS signals are currently being hopped onto one of these frequency bands, then the transmission suppressor suppresses these combined FHSS signals in that frequency band. When not suppressed, the combined FHSS signals are then amplified by the power amplifier 129 for transmission.

FIG. 22 shows one possible configuration for the receiver system 1115 in each digital ground station 108 for the FHSS implementation. It is configured and operates in a similar manner to the one shown in FIG. 15 and discussed in section 5.B.6, except for the differences discussed hereafter.

The receiver electronics block 130 does not comprise the adaptive notch filter 133 of FIG. 15. This is due to the same reason as that just discussed for why the transmitter electronics block 125 of FIG. 14 does not comprise the adaptive notch filter 128.

Furthermore, the down mixing of the FHSS signals is done in each despreading electronics sub-block 136-n. This means that the receiver electronics block 130 does not comprise the down-mixer 134 of FIG. 17. In order to perform the down mixing, each despreading electronics sub-block comprises a down-mixer 145-n. The down-mixer receives a corresponding down-mix oscillator waveform from the frequency synthesizer 120 of FIG. 20. This down-mix oscillator waveform is generated in response to the FHSS spreading code selected for the corresponding FHSS channel n and received from the FHSS spreading code generator 121. The down-mix oscillator waveform has a frequency that varies according to the FHSS spreading code. As a result, the down-mixer mixes the amplified signals from the LNA 132 with the down-mix oscillator waveform to extract and despread those FHSS signals that were originally spread and transmitted over the FHSS channel by a transmitting digital mobile unit 106 and/or ground station 108 of FIG. 1.

As those skilled in the art will recognize, there are numerous alternative configurations for each digital mobile unit 106 in this case. These alternative configurations would include similar ones to those discussed earlier in section 5.B.6.

5.C.6. Digital Ground Station Configuration

FIG. 20 also shows an exemplary configuration of each digital ground station 108 in the FHSS overlay system 102. It is configured and operates in a similar manner to that described earlier in section 5.C.5 for each digital mobile unit 106, except for the following differences.

FIG. 23 shows one possible configuration of the transmitter system 116 of FIG. 20. Each spreading electronics block 119-n does not comprise the power control attenuator 124-n of FIG. 21. This is for the same reason as those expressed earlier in section 5.B.7 for each digital ground station 108 of the DSSS implementation. Instead, the microcomputer system 114 attaches power control data to the original data from each digital data source/sink 112-n of FIG. 20 in a similar manner to that discussed in section 5.B.7.

There are numerous alternative configurations for each digital mobile unit 106 in this case. As those skilled in the art will recognize, these alternative configurations would include similar ones to those discussed earlier in section 5.B.7.

6. Conclusion

Referring back to FIG. 1, it is clear that overlaying the digital overlay system 102 (in either the DSSS or FHSS implementations) on the frequency band of the existing analog system 100 provides a number of benefits. First, it avoids the problem of switching over to a new system by allowing the existing analog system to coexist with the digital overlay system. Second, the use of the digital overlay system provides additional security benefits because the spread spectrum digital signals used inherently have greater immunity to jamming and eavesdropping compared to non-spread spectrum digital and analog signals. Third, existing analog mobile units and ground stations need not be updated when the digital overlay system begins operation, unlike in a spectrum reallocation solution. Fourth, as in a CDMA system, the digital overlay system has the ability to automatically find the correct channel by querying the ground station 106. Therefore no records need to be kept of the current channel assignments. This also prevents the operator from accidentally selecting the wrong channel. Fifth, and perhaps most importantly, the digital overlay system allows the precious frequency spectrum of the existing analog system's frequency band to be used efficiently without loss of spectrum.

Furthermore, the ultimate goal of the digital overlay system 102 is to make the existing analog system 100 obsolete by allowing users to migrate to the digital overlay system over time. There are several advantages to complete migration over to the digital overlay system. First, the capacity of the digital overlay system will increase because there will be no interference from the old analog system. This is due to the fact that the digital overlay system will be more spectrally efficient in the old analog system's frequency band than was the old analog system. Second, without interference from the old analog system, the design of the digital overlay system would no longer require notch filters 128, 133, 140, and 141 of FIGS. 14, 15, 16, and 17 or a transmission suppressor 144 of FIG. 21 in the transceivers 110 of the digital mobile units 106 and ground stations 108. This would reduce their complexity and result in corresponding cost and size savings. Third, the overall quality of communication is higher with the digital overlay system than with the old analog system.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A digital data communication overlay system that is overlaid on a predefined frequency band of an existing analog data communication system, the digital data communication overlay system comprising:

a first digital data communication unit and a second digital data communication unit;

wherein the first and second digital data communication units each have an antenna and are configured to transmit and receive spread spectrum digital data communication signals between each other over a spread spectrum digital data communication channel in which the spread spectrum digital data communication signals are spread over the predefined frequency spectrum using a frequency hopping spread spectrum (FHSS) code including a plurality of hop frequency bands and wherein each of the first and second digital data communication units independently sequentially monitor the digital data communication channel at a selected hop frequency band of the plurality of hop frequency bands to detect AM communication signals received at its antenna immediately prior to transmitting from its antenna in the selected hop frequency band, and the first digital data communication unit is configured to suppress transmission of the spread spectrum digital data communication signals in hop frequency bands in which the first digital data communication unit detects the AM communication signals from the existing analog data communication system.

2. The digital data communication overlay system of claim 1 wherein the first and second digital data communication units are configured to spread and despread the spread spectrum digital data communication signals using the same frequency hopping spread spectrum spreading code.

3. A system according to claim 1, wherein at least one of the digital communication units are located in an aircraft.

4. A system according to claim 1, wherein the first and second digital communication units each are located in an aircraft.

5. A system according to claim 1, wherein the predefined frequency spectrum includes at least a portion of the VHF band.

6. A system according to claim 1, wherein the predefined frequency spectrum includes at least a portion of the spectrum between 108 and 136 MHz.

7. A system according to claim 1, wherein at least one of the digital communication units is configured to provide a digital message queuing service.

8. A system according to claim 7, wherein the digital service is provided to an aircraft.

9. A system according to claim 1, wherein the existing analog communication system comprises an analog aviation communication system.

10. A digital data communication overlay system according to claim 1 wherein the second digital data communication unit is configured to suppress transmission of the spread spectrum digital data communication signals in hop frequency bands in which the second digital data communication unit detects the AM communication signals from the existing analog data communication system.

11. A system according to claim 1 wherein at least one of the digital communication units is configured to provide digital message prioritization.

12. A system according to claim 1 wherein at least one of the digital communication units is configured to provide digital message authentication.

13. A system according to claim 1 wherein at least one of the digital communication units is configured to provide digital message addressing.

14. A system according to claim 1 wherein at least one of the digital communication units is configured to provide digital message encryption.

15. A system according to claim 1, wherein at least one of the digital communication units is configured to provide a passive hand-over.

16. A system according to claim 1 wherein at least one of the digital communication units is configured to provide digital weather radar.

17. A system according to claim 1 wherein at least one of the digital communication units is configured to provide a digital collision avoidance service.

18. A system according to claim 1 wherein at least one of the digital communication units is configured to provide a digital position triangulation service.

19. A system according to claim 1 wherein at least one of the digital communication units is configured to provide a digital radar service.

20. A method of overlaying a digital data communication overlay system on a predefined frequency band of an existing analog data communication system, the method comprising:

transmitting and receiving spread spectrum digital data communication signals between a first and a second digital data communication unit, each having a respective antenna, over a spread spectrum digital data communication channel in which the spread spectrum digital data communication signals are spread over the predefined frequency spectrum using a frequency hopping spread spectrum (FHSS) code including a plurality of hop frequency bands;

monitoring, with the first digital data communication unit, the digital data communication channel at a selected hop frequency band of the plurality of hop frequency bands to detect AM communication signals received at its antenna immediately prior to transmitting from its antenna in the selected hop frequency band; and suppressing transmission by the first digital communication unit of the spread spectrum digital data communication signals in the selected hop frequency bands if AM communication signals from the existing analog data communication system are detected in the selected hop frequency band by the first digital communication unit.

21. The method of claim 20 wherein the transmitting and receiving step further comprises the step of using the same frequency hopping spread spectrum spreading code to spread and despread the spread spectrum digital data communication.

22. A method according to claim 20, wherein at least one of the digital communication units is located in an aircraft.

23. A method according to claim 20, wherein the first and second digital communication units each located in an aircraft.

24. A method according to claim 20, wherein the predefined frequency spectrum includes at least a portion of the VHF band.

25. A method according to claim 20, wherein the predefined frequency spectrum includes at least a portion of the spectrum between 108 and 136 MHz.

26. A method according to claim 20, wherein at least one of the digital communication units is configured to provide a digital service selected from the group of services consisting of message queuing, message prioritization, message authentication, message addressing, message encryption, passive hand-over, weather radar, collision avoidance, position triangulation, radar, position location, and combinations thereof.

27. A method according to claim 26, wherein the digital service is provided to an aircraft.

28. A method according to claim 20, wherein the existing analog communication system comprises an analog aviation communication system.

29. A method according to claim 20, further comprising:

detecting an AM analog data communication signal from the existing analog data communication system;

determining a frequency spectrum of the detected AM analog data communication signal; and suppressing transmission of the spread spectrum digital data communication signals in the determined frequency spectrum of the detected AM analog data communication signal.

30. A method according to claim 20 further comprising:

monitor, with the second digital data communication unit, the digital data communication channel at a second selected hop frequency band of the plurality of hop frequency bands to detect AM communication signals received at its antenna immediately prior to transmitting from its antenna in the second selected hop frequency band; and suppressing transmission by the second digital communication unit of the spread spectrum digital data communication signals in the second hop frequency band if AM communication signals from the existing analog data communication system are detected by the second digital communication unit.

* * * * *